United States Patent [19]

Cole et al.

[11] Patent Number: 5,452,164
[45] Date of Patent: Sep. 19, 1995

[54] THIN FILM MAGNETIC WRITE HEAD

[75] Inventors: R. Wade Cole; Jyh-shuey J. Lo; James L. Su, all of San Jose, Calif.

[73] Assignee: International Business Machines Corporation, Armonk, N.Y.

[21] Appl. No.: 192,680

[22] Filed: Feb. 8, 1994

[51] Int. Cl.⁶ .......................... G11B 5/127; G11B 5/23
[52] U.S. Cl. .................... 360/113; 360/119; 360/126
[58] Field of Search ............... 360/113, 119, 122, 126

[56] References Cited

U.S. PATENT DOCUMENTS

| | | | |
|---|---|---|---|
| 4,190,872 | 2/1980 | Jones, Jr. et al. | 360/125 |
| 4,589,042 | 5/1986 | Anderson et al. | 360/125 |
| 4,652,954 | 3/1987 | Church | 360/120 |
| 4,839,197 | 6/1989 | Henderson | 427/116 |
| 4,841,624 | 6/1989 | Togawa et al. | 29/603 |
| 5,168,409 | 12/1992 | Koyama et al. | 360/113 |
| 5,285,340 | 2/1994 | Ju et al. | 360/119 |
| 5,331,493 | 7/1994 | Schwarz | 360/113 |

FOREIGN PATENT DOCUMENTS

| | | | |
|---|---|---|---|
| 60-10409A | 1/1985 | Japan | G11B 5/31 |
| 63-247903 | 10/1988 | Japan | 360/119 |
| 3-162706A | 7/1991 | Japan | G11B 5/31 |

*Primary Examiner*—John H. Wolff
*Attorney, Agent, or Firm*—Baker, Maxham, Jester & Meador

[57] ABSTRACT

A thin film magnetic write head is provided wherein the write head has a pole tip region between a planar air bearing surface (ABS) and a zero throat level and a back region which extends back from the zero throat level to and including a back gap. The write head has a yoke which includes top and bottom magnetic poles. Each pole has a pole tip structure in the pole tip region and a back portion in the back region. The pole tip structure of the bottom pole has bottom and top pole tip elements PT1a and PT1b and the pole tip structure of the top pole has a top and bottom pole tip elements PT2a and PT2b. The pole tip elements PT1b and PT2b are located between the pole tip elements PT1a and PT2a and a gap layer G is located between the pole tip elements PT1b and PT2b. Each of the pole tip elements PT1b and PT2b and the gap layer G are bounded by front and back walls and first and second sidewalls. The first sidewalls of the pole tip elements PT1b and PT2b and the gap layer G are aligned with respect to one another and the second sidewalls of the pole tip elements PT1b and PT2b and the gap layer G are aligned with respect to one another. The front walls of the pole tip elements PT1b and PT2b and the gap layer G lie in a common plane which forms a portion of the ABS. The back walls of the pole tip elements PT1b and PT2b and the gap layer G lie in a common plane which forms the zero throat level. The common plane of the zero throat level is substantially parallel to the common plane of the ABS.

33 Claims, 16 Drawing Sheets

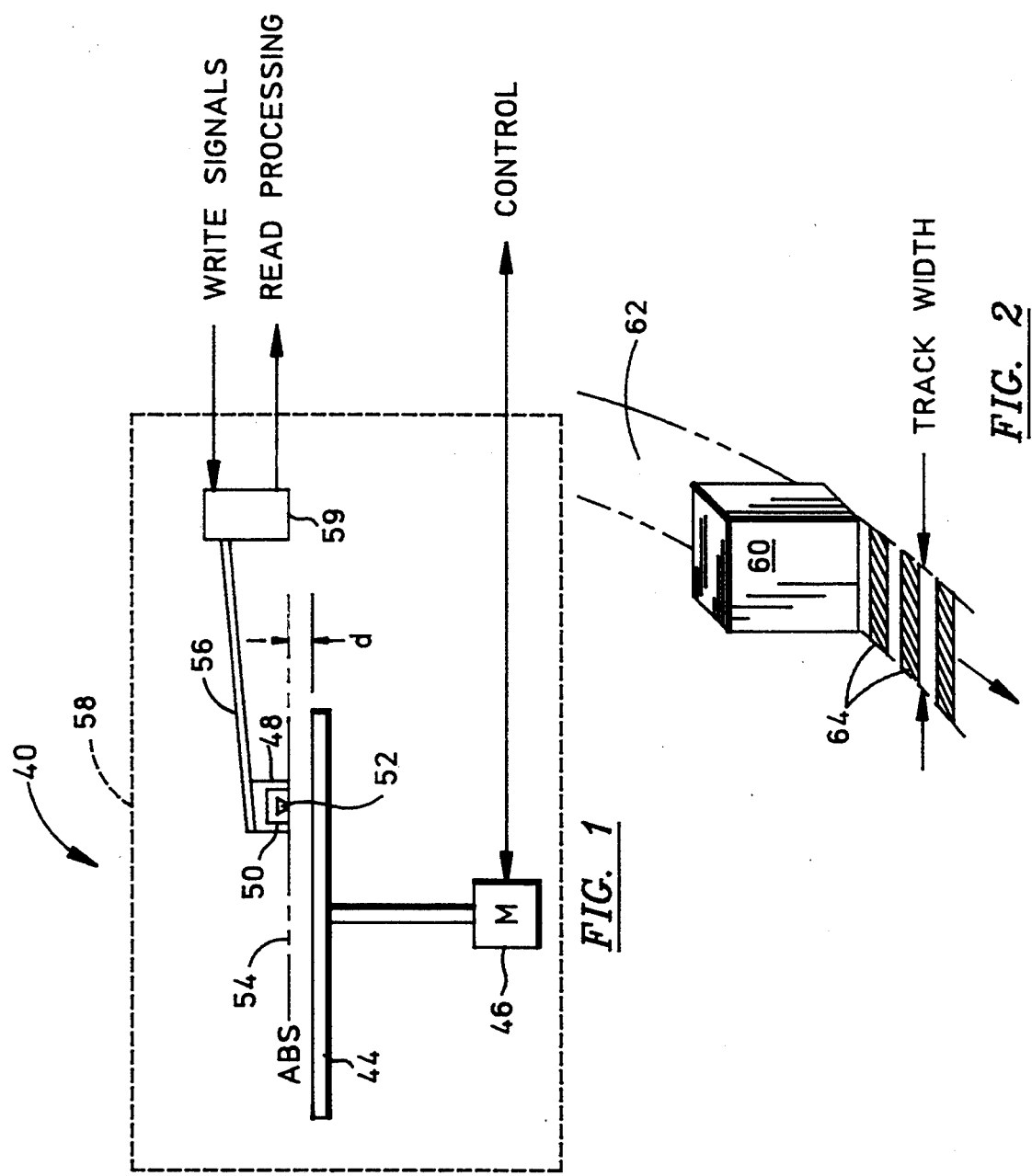

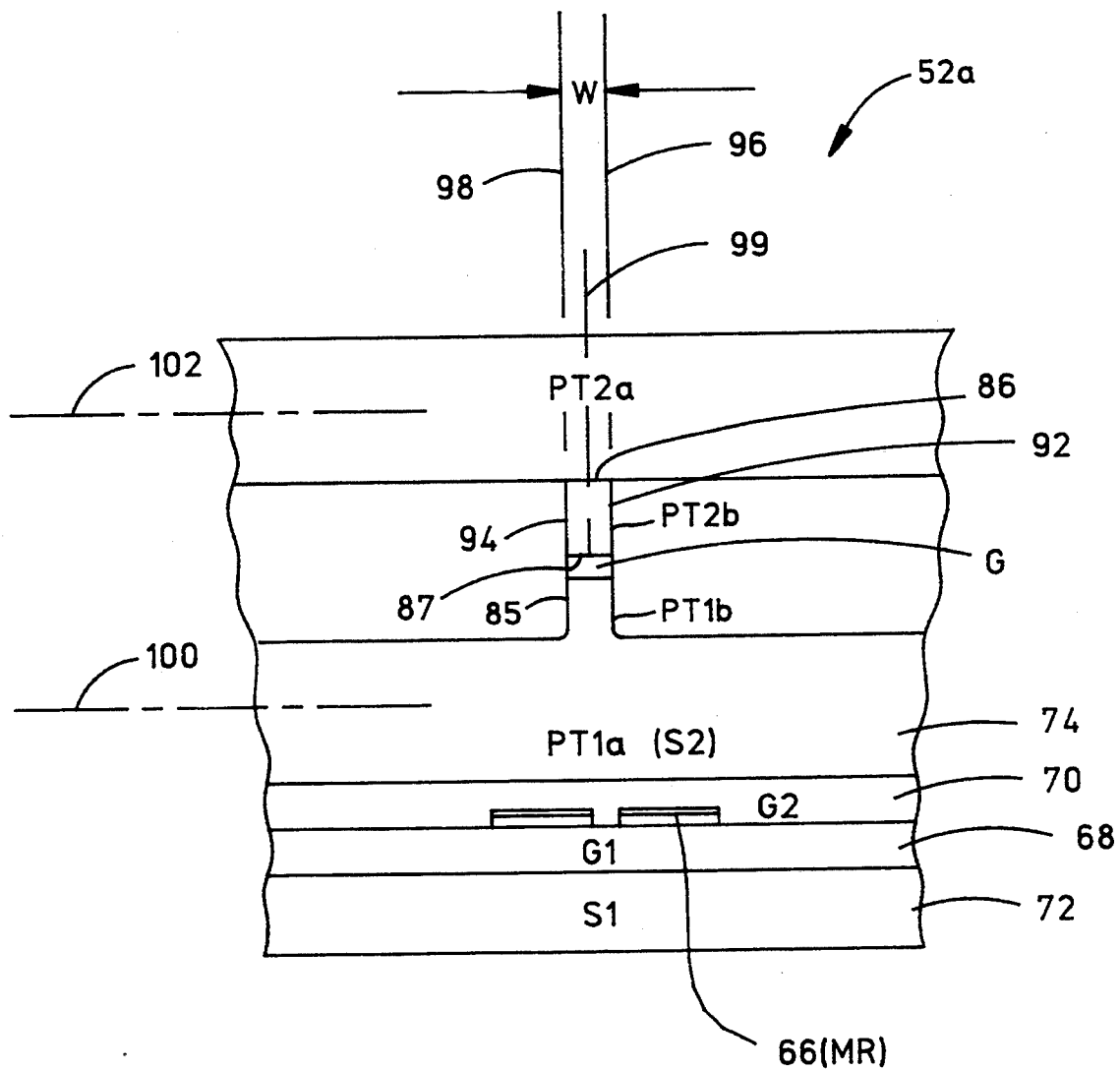
FIG. 6 (ABS)

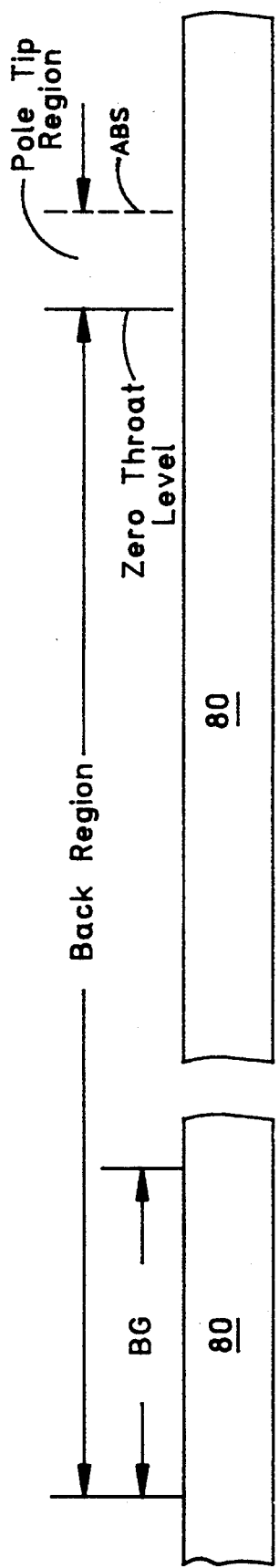
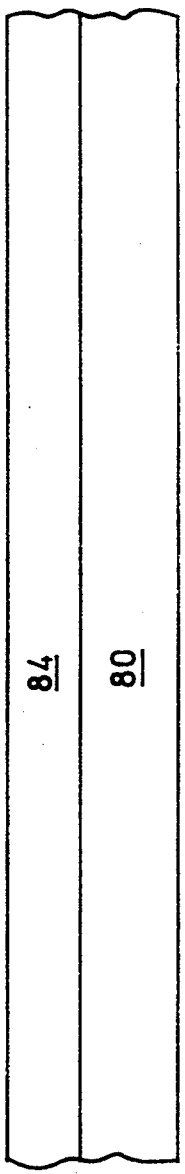
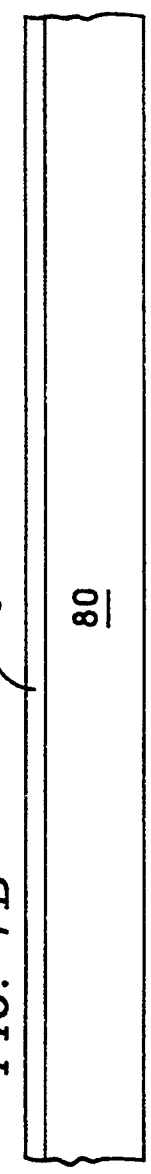
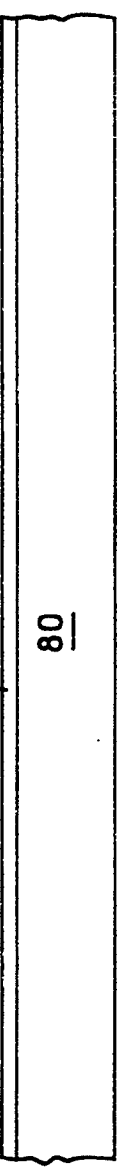
FIG. 7A
FIG. 7B
FIG. 8
FIG. 9

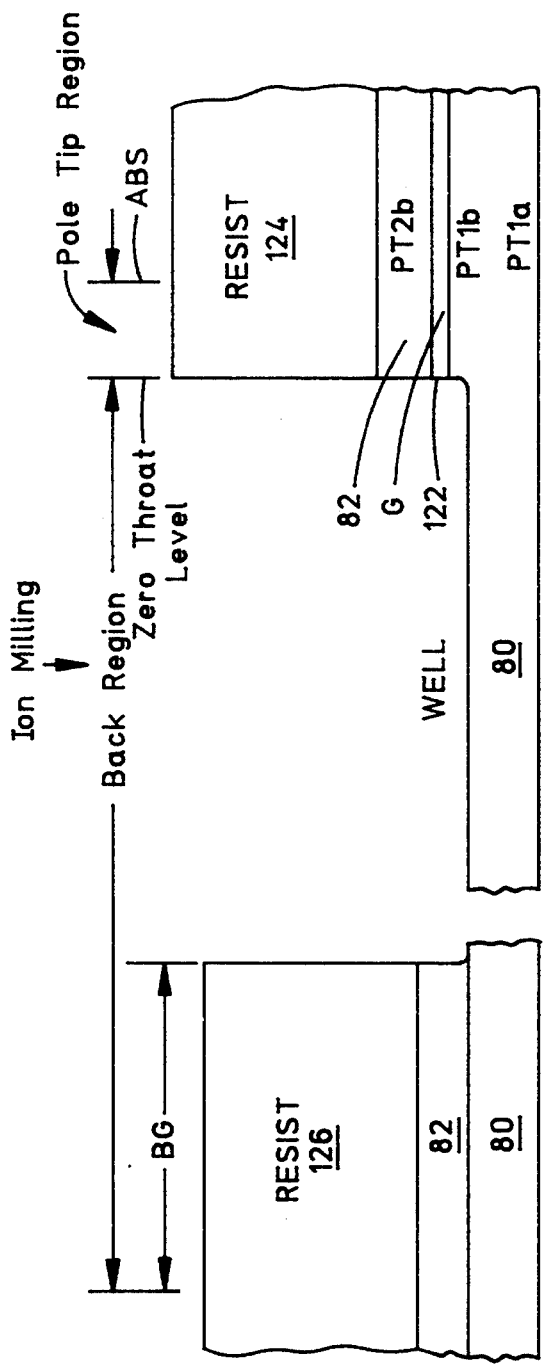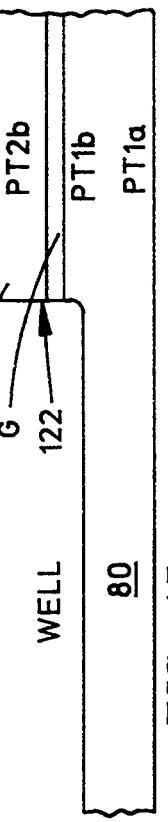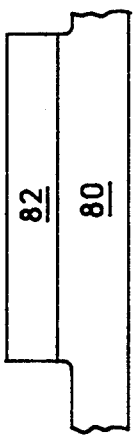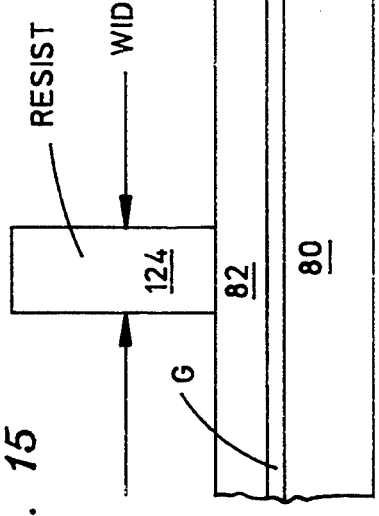
FIG. 14
FIG. 15
FIG. 13

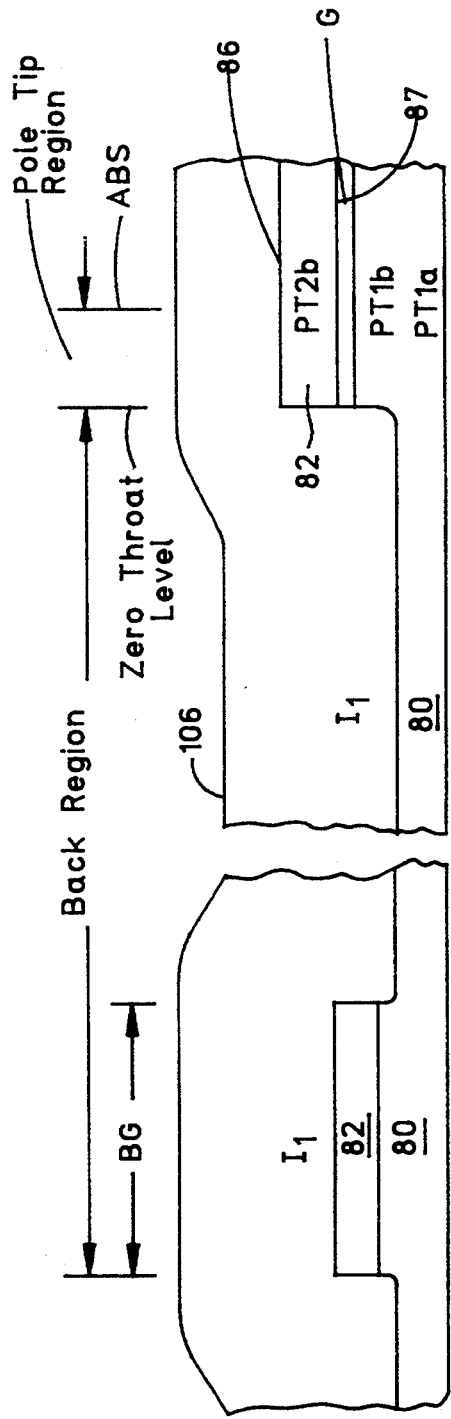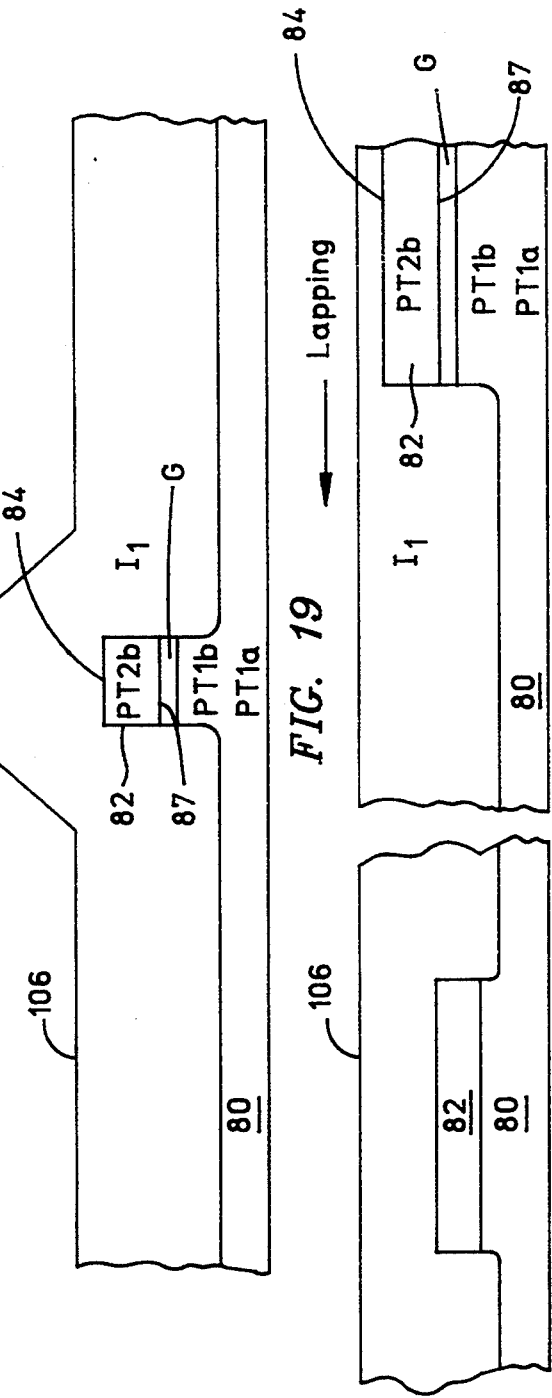
FIG. 18
FIG. 19
FIG. 20

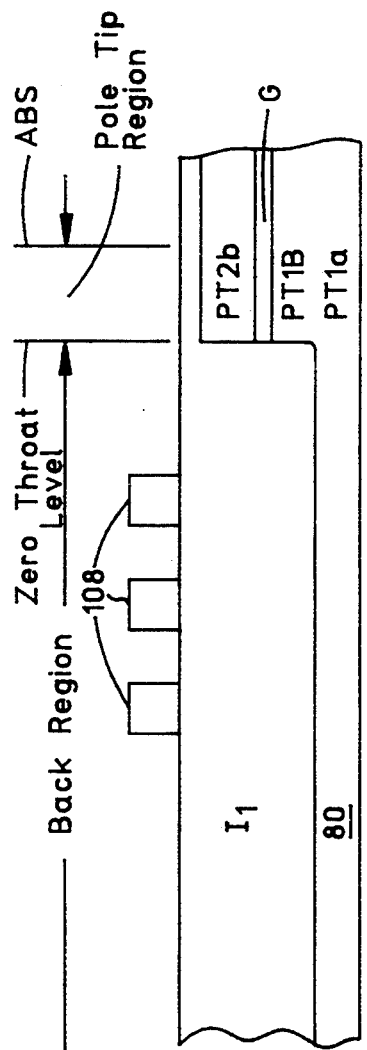
FIG. 23
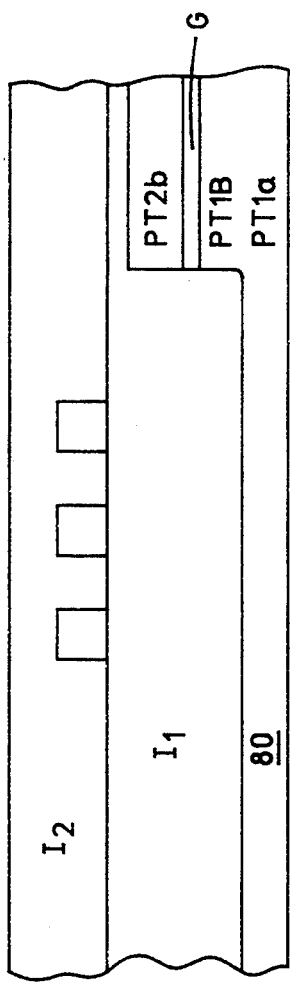
FIG. 24
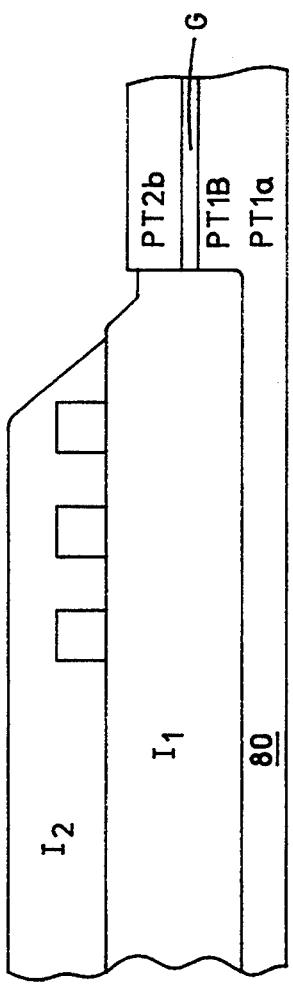
FIG. 25
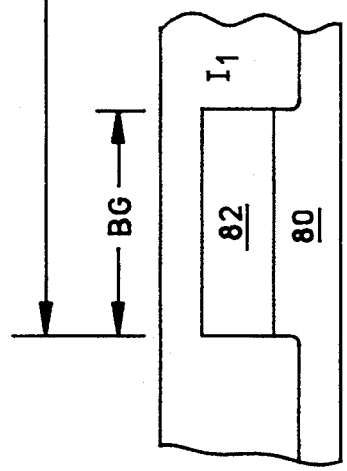
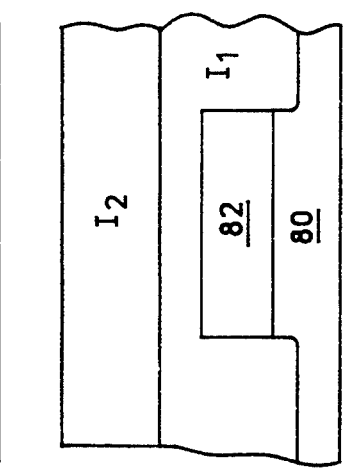
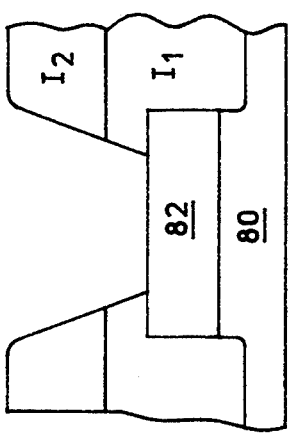

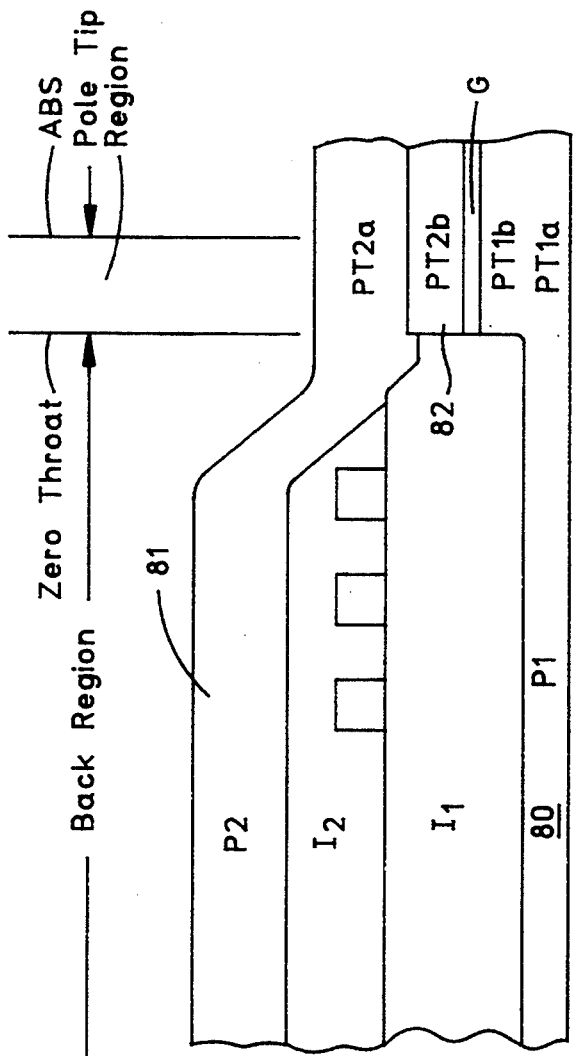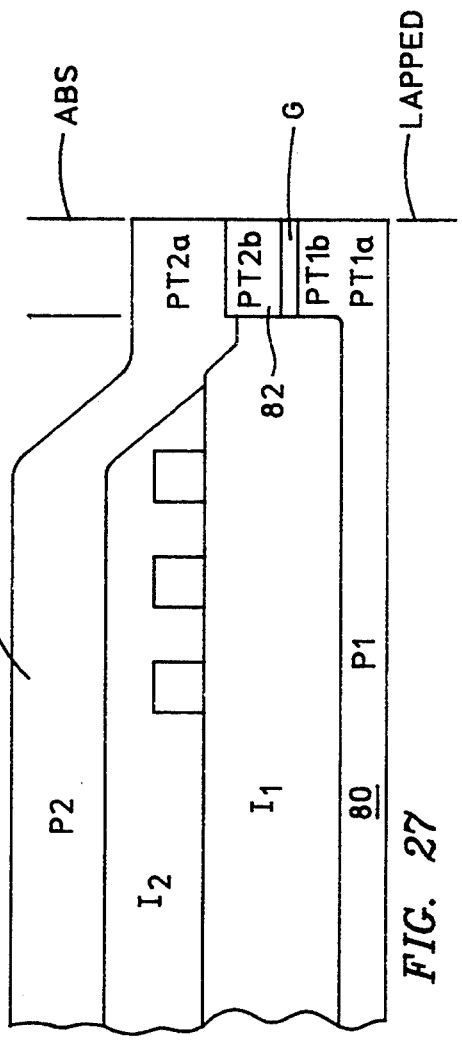
FIG. 26
FIG. 27
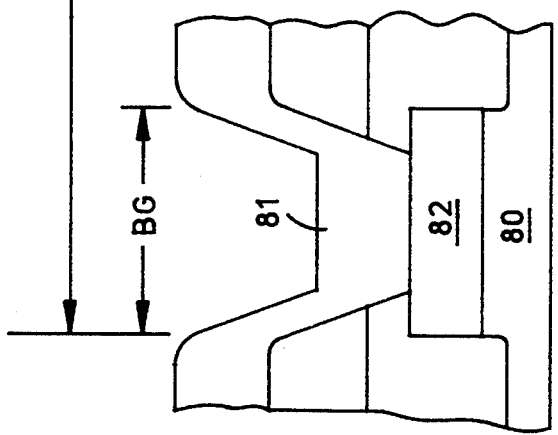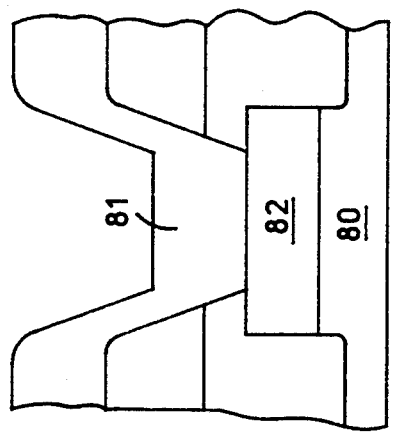

THIN FILM MAGNETIC WRITE HEAD

BACKGROUND OF THE INVENTION

1. Field of the Invention

The present invention relates to a thin film magnetic merged write head which has a well defined pole tip structure.

2. Discussion of the Related Art

In a magnetic disk drive, data is written and read by magnetic transducers called "heads" which are positioned over a disk while it is rotated at a high speed. Magnetic heads are supported over a surface of the disk by a thin cushion of air (an "air bearing") produced by the disk's high rotational speed. In order to increase the amount of data stored per unit of disk surface area ("areal density"), more data must be written in narrower tracks on the disk surface. Accordingly, areal density of magnetic recording can be improved by increasing the number of data tracks which a write head can record on a disk; the related parametric expression is "tracks per inch" or "TPI". The TPI capability of a write head is increased by decreasing the head dimension which determines the width of a data track; typically this dimension is called the head "track width".

In the magnetic recording technology, thin film magnetic heads are desirable because of their high resolution and high areal density respectively. They are also easy to manufacture. With various thin film manufacturing techniques, they can be fabricated in batches on a ceramic substrate and then cut into individual heads.

A thin film write head includes a pair of pole pieces that are formed from thin films ("layers") of magnetic material. These layers are called "pole layers". The pole layers have a pole tip height dimension commonly called "throat height". In a finished write head, throat height is measured between an air bearing surface ("ABS"), formed by lapping and polishing the tips of the pole layers ("pole tips"), and a zero throat height level ("zero throat level") where the first pole layer (P1) and the second pole layer (P2) converge at the magnetic recording gap.

A thin film magnetic write head includes a pole tip region which is located between the ABS and the zero throat level and a back area which extends back from the zero throat level to and including a back gap. The write head includes a yoke which has top and bottom pole layers, each pole layer having a pole tip portion in the pole tip region and a back portion in the back region. The pole layers are connected together at the back gap.

An important manufacturing objective is to precisely define the pole tip of the write head, thereby to maximize areal density. As is known, areal density is determined in part by the number of flux reversals per millimeter of track length, which, in turn, depends upon the length of the gap between the pole tips ("gap length"). By decreasing the gap length, the bit density within a track is increased. The shortness of the gap length is limited by the decreasing flux intensity between the pole tips. The lower limit of the gap length to optimize bit density and flux intensity is substantially 0.2 microns. Accordingly, efforts have not been made to reduce the gap length below 0.2 microns. Instead, efforts have been directed toward reducing the track width of the write head, which is determined by the width of the thin film layers forming the pole tips at the ABS.

The pole tips are extensions of the bottom and top pole layers (P1 and P2, respectively) of the write head. The bottom pole layer transitions to a pole tip in the pole tip region and the top pole layer transitions to a pole tip in the pole tip region. The pole tips are separated by a gap (G) which is a thin layer of insulation material. The pole tip of the top layer P2 is the last element to induce flux into a magnetic medium; therefore, its width is more important than the width of the pole tip on the bottom pole layer P1. However, it is desirable for the pole tips to have the same width so as to minimize flux leakage therebetween.

In the prior art it has been difficult to fabricate the pole layers with tips less than 2 microns in width. This is because the width of the top pole layer at the pole tip region is typically defined after placement of the coil structure, one or more insulation layers and the top pole layer. In the prior art the width of the pole tip of the top pole layer P2 is defined by forming a thick photoresist mask on top of the top pole layer and then etching the width configuration at the pole tip region. The thickness of the resist layer has to be 20 microns or more in order to protect the top pole layer from ion bombardment. When the resist layer is thick, it cannot be sharply configured by a photoresist mask. This in turn means that the subsequent step of etching cannot produce a pole tip with a width less than 2 microns.

Another problem in fabrication of thin film write heads is the difficulty in precisely positioning the zero throat level. The zero throat level is where the pole tip region of the write head transitions to the back region of the write head. The back region includes a coil structure sandwiched between insulation layers which, in turn, are sandwiched between the top and bottom pole layers. Because of the difficulty in maintaining well defined frontal configurations of the top insulation layer and the top pole layer at the zero throat level, the zero throat level is not well defined. It is desirable to provide the zero throat level in a well defined plane which is parallel to the plane of the ABS. The pole tips and the gap layer should have back surfaces which lie in a common plane which is parallel to the ABS. This will prevent flux leakage from the top pole layer into the back portions of the pole tip.

Still another problem in the prior art has been planarization of the write head structure during fabrication. During fabrication, the insulation layers which sandwich the coil structure flow into the pole tip region. This results in a high topography in the back region before the top pole layer is deposited. Planarization is important for the top pole layer so as to control its thickness and effectiveness.

SUMMARY OF THE INVENTION

The present invention provides a method of making a thin film magnetic head which has a narrow pole tip structure at the air-bearing surface and a well defined zero throat level at the back of the pole tip structure. This is accomplished by defining a pole tip structure prior to deposition of the top pole layer. First, the bottom pole layer or layers, the gap layer and a lower layer for the top pole are formed. At this point, the partially completed head is still planar. A photoresist mask with a thickness of between 5 and 10 microns is formed. This allows the photoresist mask to define a track width less than 1 micron for the pole tips. A thick resist layer is not required since the top pole layer P2 has not yet been deposited. The pole tip structure is then defined with etching, such as ion beam milling. This provides top and bottom pole tips which have a very narrow track width all the way from the ABS to the zero throat level. The pole tips on opposite sides of the gap layer can be made symmetrical which will support good flux transfer without any leakage. The ion milling also forms a planar zero throat level which is substantially parallel to the plane of the ABS. This zero throat level configuration minimizes any flux leakage between the top pole layer P2 (deposited later in the fabrication) and the pole tips. Further, the height of the pole tips from the ABS to the zero throat level can now be accurately defined.

The ion milling also forms the back structure of the head between the zero throat level and the back gap to provide a well down to or into the bottom pole layer P1. The well is formed between the zero throat level and the back gap and it constrains the first insulation layer, the coil layer, and subsequent insulation layers to be substantially planar. The top insulation layer can be made slightly higher than the top of the pole tip for the pole layer P2 so that lapping can be done to enhance the planarization. The top pole layer P2 is then deposited. A front surface of the top pole layer P2 at the ABS can have quite a large area since it is distanced from the gap by the top pole tip. Likewise, the bottom pole layer can have a large surface area at the ABS which is distanced from the gap by the bottom pole tip. Essentially, this configuration provides a conformal pole tip structure at the ABS which has very narrow pole tips to provide a narrow track width, and relatively large pole layers to provide maximum flux transfer without any leakage. The top and bottom pole tips are aligned to prevent flux leakage. Since the fabrication provides a planar structure, the thickness of the overcoat layer can be substantially less than that allowed by the prior art.

An object of the present invention is to provide a magnetic write head which has a well defined submicron track width.

Another object is to provide a magnetic write head which has well defined pole tip elements at the ABS and a well defined accurately placed zero throat level, the zero throat level lying in a plane which is substantially parallel to the plane of the ABS.

A further object is to provide a magnetic write head which has virtually no flux leakage between the pole tips at the ABS and no flux leakage between top and bottom pole layers at the zero throat level.

Yet another object is to provide a magnetic write head which has a planarized top pole layer.

Still another object is to provide a magnetic write head which has pole tips which are constructed of a material which is different than the materials of top and bottom pole layers.

Still another object is to provide a magnetic read/write head (merged head) which meets any one or combination of the aforementioned objectives.

Still a further object is to provide a drive which employs a write and/or read/write head which meets any one or more of the aforementioned objectives.

Still a further object is to provide a method of fabricating a write and/or read/write head which meets any one or combination of the aforementioned objectives.

Other objects will become apparent when considered in light of the following description of the invention.

BRIEF DESCRIPTION OF THE DRAWINGS

For a more complete understanding of this invention, reference is now made to the following detailed description of the embodiments as illustrated in the accompanying drawing, wherein:

FIG. 1 is a schematic illustration of a magnetic disk drive, not to scale, which employs a thin film write head of the present invention;

FIG. 2 is a schematic illustration of the critical portion of the pole tip of a thin film write head positioned above a track of a magnetic disk;

FIG. 6 is a schematic air bearing surface (ABS) view of the critical elements of a merged head, and is slightly modified from the FIG. 5 write head to provide a second embodiment.

FIGS. 7A and 7B and FIGS. 8-29 are schematic illustrations of a sequence of steps involved in the fabrication of the thin film magnetic write head.

DETAILED DESCRIPTION OF THE PREFERRED EMBODIMENTS

Figure 3:
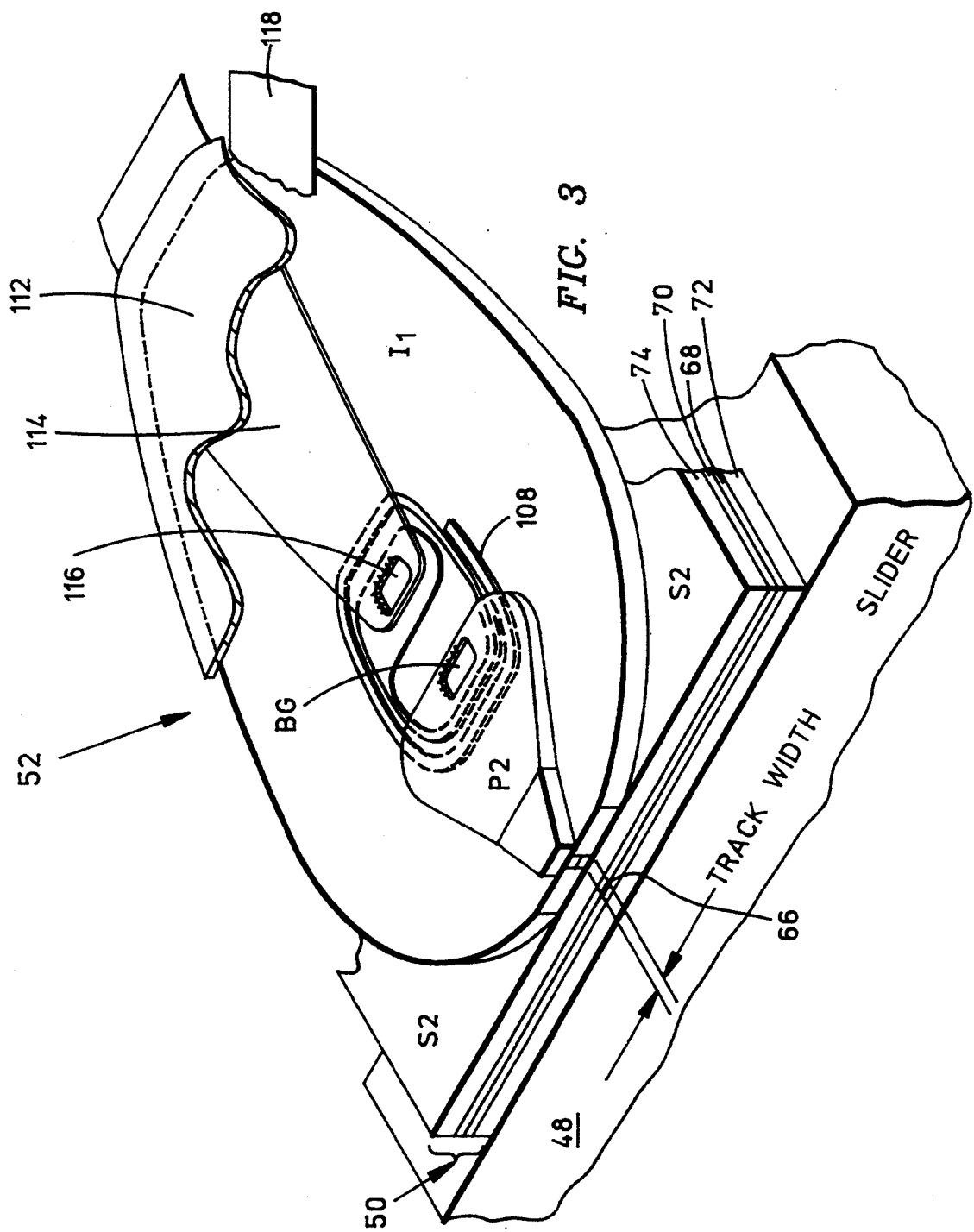
FIG. 3 is an isometric illustration of a merged thin film head with the write head layers being mounted on top of the layers of a read head.

Referring now to the drawings wherein like reference numerals designate like or similar parts throughout the similar views, there is illustrated in FIG. 1 a magnetic disk drive 40 which includes a rotating magnetic disk 44. The disk 44 is rotated by a motor 46 which is responsive to control signals from a drive control source (not shown). When the magnetic disk 44 is rotated, a merged head, which is mounted on a slider 48, is supported against a surface of the magnetic disk 44 by an air bearing. The merged head may include a read head 50 and a write head 52. The bottom surfaces of the slider 48 and the merged head (50 and 52) are in the plane of the air bearing surface (ABS) 54. The ABS 54 is spaced from the surface of the magnetic disk 44 by a distance d when the magnetic disk is rotating. The slider 48 is connected to a head suspension assembly 56 which includes means for conducting read/write signals between drive electronics 59 and the head. The above components of the drive are mounted within a drive housing 58.

Essential elements of a write head are schematically illustrated at 60 in FIG. 2 in operating relationship with a track 62 of a rotating magnetic disk. Flux reversals representing bits induced on the track by the write head are schematically illustrated at 64. The number of these flux reversals per millimeter length of the track is a measure of the linear or bit density of the write head. When the length of the write head gap is reduced, the bit density is increased. Heretofore, the optimum bit density obtainable has been with a gap length of approximately 0.1 to 0.4 microns. When the gap length is reduced much less than this amount, the flux density between the pole tips is insufficient for adequate writing. Another important measure, however, is the TPI of the write head 60. The narrower the width of the write head's pole tip elements, the greater the TPI. Accordingly, one of the prime objectives of the present invention is to provide pole tip elements for a write head which have a width less than 1 micron, but which retain the optimum gap length of approximately 0.2 to 0.3 microns.

Figure 4:
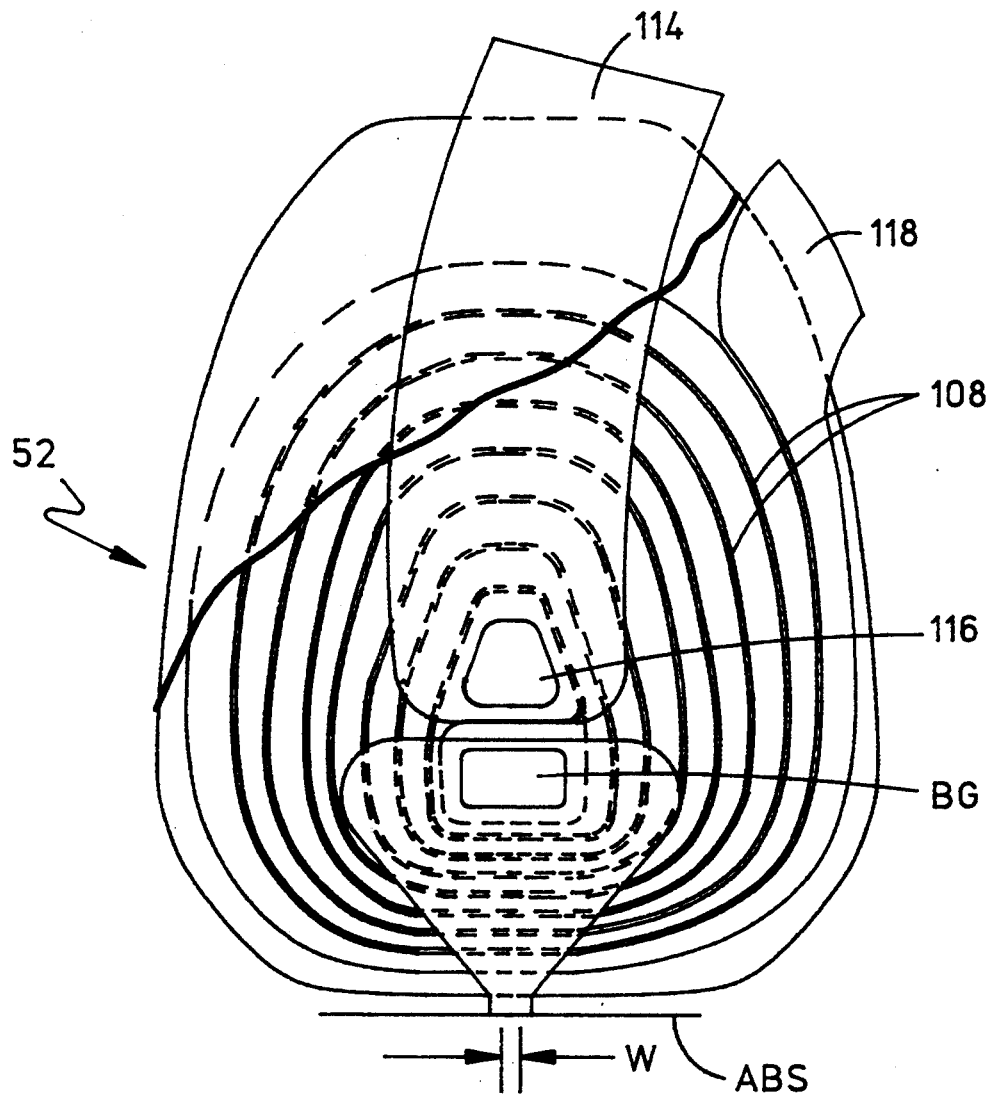
FIG. 4 is a top planar schematic illustration of the write head of FIG. 3.
Figure 5:
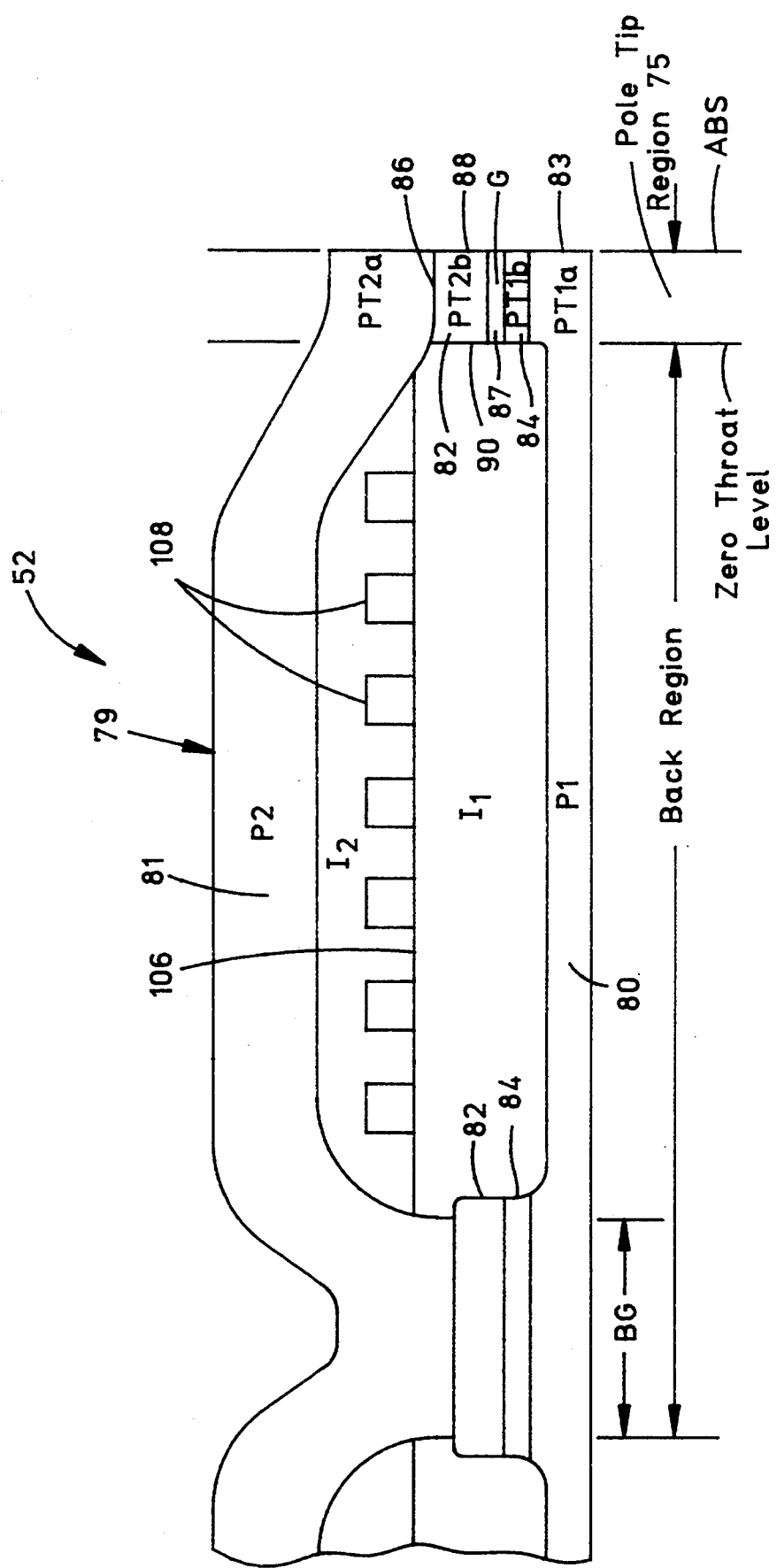
FIG. 5 is a schematic cross-sectional view through the write head, not to scale, perpendicular to the plane of the ABS.

FIG. 3 illustrates a portion of a merged head that includes a read head and a write head. The read head is indicated generally by 50 and the write head is indicated generally by 52. The merged head is formed on the slider 48. FIGS. 4 and 5 show additional details of the write head 52; FIG. 6 is an ABS schematic illustration of a slightly modified embodiment 52a of the invention. The embodiment 52a is also combined with an MR read head to provide a merged MR head.

As shown in FIGS. 3 and 6, the read head 50 includes a magnetoresistive element 66 which is sandwiched between first and second gap layers 68 and 70, the gap layers in turn being sandwiched between first and second shield layers 72 and 74. In a merged head configuration it may be desirable that the second shield layer 74 of the read head also serve as the bottom pole layer for the write head as will be explained in more detail hereinafter.

As shown in FIG. 5, the write head 52 has a pole tip region 75 which is located between the air bearing surface (ABS) and a zero throat level and a back region which extends back from the zero throat level to and including a back gap. A yoke is provided which includes a bottom pole P1 and a top pole P2. The bottom pole includes a bottom magnetic layer 80 and the top pole includes a top magnetic layer 81. Each pole P1 and P2 also has a back layer portion which is located in the back region, the back layer portions of the poles being magnetically connected at the back gap (BG). The bottom pole P1 includes a pole tip structure which is located in the pole tip region 75 between the ABS and the zero throat level. This pole tip structure may include a bottom pole tip element PT1a and a top pole tip element PT1b. The top pole P2 includes a pole tip structure which is located in the pole tip region 75 between the ABS and the zero throat level. This pole tip structure includes a top pole tip element PT2a and a bottom pole tip element PT2b. The pole tip element PT2a is a front portion of the magnetic layer 81 of the top pole P2 and the pole tip element PT2b is a separate magnetic layer 82.

In FIG. 5, the pole tip elements PT1a and PT1b are separate magnetic layers 83 and 84 respectively. The magnetic layer 83 may be a forward extension of the magnetic layer 80 of the bottom pole P1, after a forming process to be described hereinafter, and the magnetic layer 84 is a separate layer deposited thereon.

Another embodiment 52a of the invention is shown in FIG. 6. The only difference from the FIG. 5 embodiment is that the pole tip structure of the bottom pole P1 is a single layer 85. The single layer 85 may be a forward extension of the magnetic layer 80 of the bottom pole P1 which is formed by a process to be described in detail hereinafter. When the bottom pole P1 has only a single layer several fabrication steps are eliminated. However, it may be desirable for the pole tip elements PT1a and PT1b to be constructed of different materials in which case the pole tip element PT1b would be a separate layer 84 as shown in FIG. 5. In both embodiments the bottom pole P1 may comprise the second shield layer 74 (see FIG. 3) of the MR read head. With this arrangement a merged MR head is provided. A merged head has the advantage of reducing read head to write head spacing and eliminating fabrication steps.

As shown in FIGS. 5 and 6, a pole gap layer (G) is sandwiched between the pole tip elements PT1b and PT2b. A desired thickness (gap length) of this layer is about 0.2 to 0.3 microns which will optimize the linear density of the write head without sacrificing its flux intensity.

As shown in FIGS. 5 and 6, the pole tip element PT2b is a layer which has top and bottom film surfaces 86 and 87. These film surfaces are bounded by a front wall 88 at the ABS, a back wall 90 at the zero throat level (see FIG. 5) and first and second sidewalls 92 and 94 (see FIG. 6). In the FIG. 5 embodiment each of the pole tip element PT1b and the gap layer G have top and bottom film surfaces. These film surfaces are bounded by a respective front wall at the ABS, a back wall at the zero throat level and first and second sidewalls. As shown in FIG. 5, the front walls of the pole tip element PT1b, the gap layer G and the pole tip element PT2b lie contiguously in a common plane which forms a portion of the ABS.

The back walls of the pole tip element PT2b, the gap layer G and at least a portion of the back wall of the pole tip structure of the bottom pole P1 lie contiguously in a common plane which defines the zero throat level. In the FIG. 5 embodiment the back wall of the pole tip element PT1b, and optionally a portion of the back wall of the pole tip element PT1a, lie in the common plane at the zero throat level. In the FIG. 6 embodiment, the back wall (not shown) of the pole tip element PT1b lies in the common plane at the zero throat level. The plane of the zero throat level is substantially parallel to the plane of the ABS and perpendicular to the film surfaces of the pole tip element PT2b and the gap layer G. The planar construction of the zero throat level is one of the features of the present invention. After the top magnetic layer 81 of the top pole P2 is deposited, the zero throat level retains its planar configuration. This configuration minimizes flux transfer from the back layer portion of the top pole P2 to the back wall of the pole tip element PT1b and from the back layer portion of the pole P1 to the back wall of the pole tip element PT2b.

As shown in FIG. 6, the first sidewalls of the pole tip element PT1b, the gap layer G and the pole tip element PT2b lie in a first common plane 96 and the second sidewalls of the pole tip element PT1b, gap layer G and pole tip element PT2b lie in a second common plane 98. The first and second sidewalls of the pole tip elements PT1b and PT2b are aligned with one another along planes 96 and 98, respectively, so as to minimize flux leakage to areas outside of the desired track. The first and second common planes 96 and 98 are (1) parallel to one another, (2) perpendicular to the ABS, (3) perpendicular to the film surfaces of the pole tip element PT2b and the gap layer G and (4) spaced from one another by a distance w which is the track width of the write head. The distance w between the first and second common planes 96 and 98 is in the range of 0.7 microns to 1 micron. This narrow track width is obtained by the process of the present invention to be described hereinafter. By narrowing the track width, the track density is increased which, in turn, increases the areal density of the write head.

The desired length of the front wall of the pole tip element PT2b along its longitudinal axis 99 at the ABS is approximately 1½ times the thickness (gap length) of the pole tip gap layer G. The pole tip element PT2b is the most critical portion of the pole tip since it is the last element to induce flux into a magnetic medium moving therebelow. Beyond the 1½ distance from the gap layer G toward the pole tip element PT1a the flux intensity is too low to be of any significance. It is desirable that the pole tip element PT1b be similarly configured and aligned with the pole tip element PT2b so that there is no off track flux leakage. With such an arrangement a more widely extending pole tip element PT1a and pole tip element PT2a can be employed. As shown in FIG. 6, the areas of the pole tip elements PT1b and PT2b are smaller than the areas of the pole tip elements PT1a and PT2a, respectively. As seen at the ABS the pole tip elements PT1b and PT2b may be submicron in width, the width of the pole tip element PT2a may be in the order of 7 microns and the width of the pole tip element PT1a may be in the order of 50 microns with approximately the same pole tip thickness.

As shown in FIG. 6, each front wall of the pole tip elements PT1b and PT2b at the ABS is substantially rectangular with a common longitudinal axis 99 which is perpendicular to the film surfaces of the pole tip element PT2b. The front walls of the pole tips PT1a and PT1b are also substantially rectangular with respective longitudinal axes 100 and 102. The longitudinal axes 100 and 102 of the front walls of the pole tip elements PT1a and PT2a are parallel with respect to one another and are perpendicular to the longitudinal axis 99 of the pole tip elements PT1b and PT2b.

As shown in FIG. 5, a first insulation layer $I_1$ is located on top of a back portion of the bottom magnetic layer 80 of the bottom pole P1. The insulation layer $I_1$ has a top flat surface 106 which is higher than the top film surface 86 of the pole tip element PT2b. This is another important feature of the present invention. When the magnetic layer 81 of the top pole P2 is subsequently formed the height of the insulation layer $I_1$ distances the back portion of the magnetic layer 81 from the back walls of the pole tip structure at the zero throat level. With this arrangement flux leakage from the back portion of the magnetic layer 81 of the top pole P2 to the back wall of the pole tip element PT1b is minimized. As will be explained in more detail hereinafter the flat surface 106 of the insulation layer $I_1$ can be obtained by lapping. A coiled conductor layer 108 is mounted on top of the flat surface 106 of the insulation layer $I_1$, which conductor will be described in more detail hereinafter. One or more insulation layers 12 are mounted on top of the conductor layer 108. Because the structure of the present write head is essentially planar, only one insulation layer 12 is required on top of the conductor layer 108, thus eliminating several steps in the fabrication. As shown in FIG. 5, the back portion of the magnetic layer 81 of the top pole P2 is located on top of the second insulation layer 12.

As shown in FIGS. 5 and 6, the top film surface 86 of the pole tip element PT2b engages the bottom film surface of the pole tip element PT2a in a direct film-surface-to-film-surface relationship. Further, the top and bottom film surfaces of the pole tip gap layer G engage the bottom film surface 87 of the pole tip element PT2b and the top film surface of the pole tip element PT1b respectively, in a direct film-surface-to-film-surface relationship.

FIGS. 3 and 4 illustrate a more complete embodiment of the write head with portions cut away to illustrate various details thereof. Part of a cover layer 112 and the insulation layer 12 have been removed in FIG. 3. The conductor 108 spirals around the back gap BG between the top and bottom poles P1 and P2. One end of the conductor 108 is connected to a lead 114 at 116 and the other end (not shown) of the conductor is connected to a lead 118. When a signal current is transmitted to the conductor 108 via the leads 114 and 116 the current in the conductor induces flux in the top and bottom poles P1 and P2. This, in turn, induces flux back and forth between the pole tips at the ABS. Because of the very narrow track width, discussed hereinabove, the areal density of the write head is significantly improved. Further, because of the alignment of the back walls and the sidewalls of the pole tip elements PT1b and PT2b flux leakage at the zero throat level and at the ABS is substantially eliminated to improve the resolution of the write head. The fabrication of the write head is described in the following paragraphs.

Method of Making the Write Head

Various thin film fabrication techniques are employed to construct the write head 52 of FIG. 5. and the write head 52a of FIG. 6. These techniques include: (1) plating a conductive material after doing a frame photo; (2) etching after performing an etch photo; (3) ion beam milling after doing a milling photo; (4) etching after doing a gap etch photo; and (5) etching after doing a back gap etch photo. The frame photo is accomplished by depositing a resist layer and exposing it with light through a mask with the desired configuration. The exposed portions of the resist layer are then developed and removed with a solution leaving a photoresist mask which has exposed portions for plating. If the conductive layer is being plated onto a non-conductive layer, a seed layer precedes the frame photo step. After plating the conductive layer, the photoresist mask is dissolved in a solution to leave the conductive layer with the desired configuration. The etch photo is the same as a frame photo except it is used for etching purposes. The exposed areas about the photoresist mask are etched. After etching the photoresist mask is then removed. A milling photo is the same as the other photos except it is used for milling purposes. After the milling operation the photoresist mask is removed. The gap etch photo is the same as the other photos except it leaves unwanted gap layer portions exposed to be etched away. The back gap etch photo is the same as the other photos except the exposed area is at the back gap BG where unwanted layers are removed. Another thin film technique is lapping which is a grinding or polishing technique to form the ABS or to planarize a thin film layer.

The fabrication steps for a FIG. 6 embodiment of the invention are shown in FIG. 7A and FIGS. 8–28 and the fabrication steps for the FIG. 5 embodiment are shown in FIG. 7B and FIGS. 8–28. In the FIG. 6 embodiment the pole tip elements PT1a and PT1b are constructed from a single layer 80. The fabrication steps for the FIG. 5 embodiment differ from the FIG. 6 embodiment in that two layers 80 and 84 are deposited to form the pole tip structure of the bottom P1 as shown in FIG. 7B.

As shown in FIG. 7A, the magnetic layer 80 of the bottom pole P1 is deposited in the pole tip and back regions. The formation of this layer may be accomplished by a frame photo and plating with a thickness of 2 to 3 microns. This is the only layer used for constructing the pole tip elements PT1a and PT1b of the bottom pole P1 for the FIG. 6 embodiment. Next, as shown in FIG. 8, a gap layer G is deposited on top of the magnetic layer 80 of the bottom pole P1 in the pole tip and back regions. In the FIG. 5 embodiment a top magnetic layer 84 of the bottom pole P1 is deposited on top of the bottom magnetic layer 80 of the bottom pole P1, as shown in FIG. 7B, and then the gap layer is deposited (not shown) on top of the magnetic layer 84. The remainder of the fabrication steps described herein apply equally to the FIG. 5 and FIG. 6 embodiments. In both embodiments the magnetic layer 80 of the bottom pole P1 may comprise the second shield layer 74 (see FIG. 3) of the MR read head.

The gap layer, which is an insulation material, has a thickness of 0.3±0.1 microns. As shown in FIG. 9, the gap layer G is then removed in the back gap area to expose the magnetic layer 80 at the back gap for connecting purposes to be described hereinafter. The removal of the gap layer G at the back gap may be accomplished by an etch photo and etching the unwanted portions.

Figure 10:
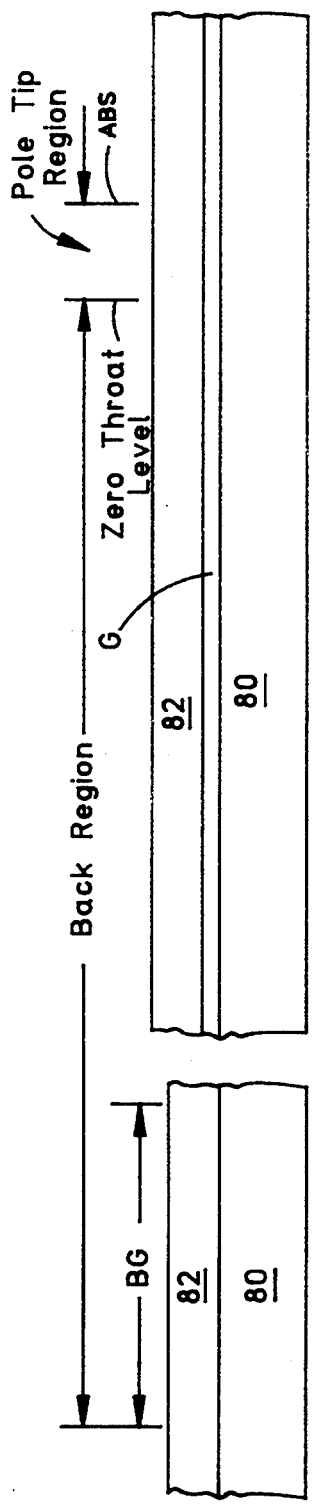

As illustrated in FIG. 10, the bottom magnetic layer 82 of the top pole P2 is deposited on top of the gap layer G and on top of the exposed magnetic layer 80 of the bottom pole P1 at the back gap BG. This formation makes a magnetic connection between the bottom magnetic layer 82 of the top pole P2 and the magnetic layer 80 of the bottom pole P1.

Figure 11:
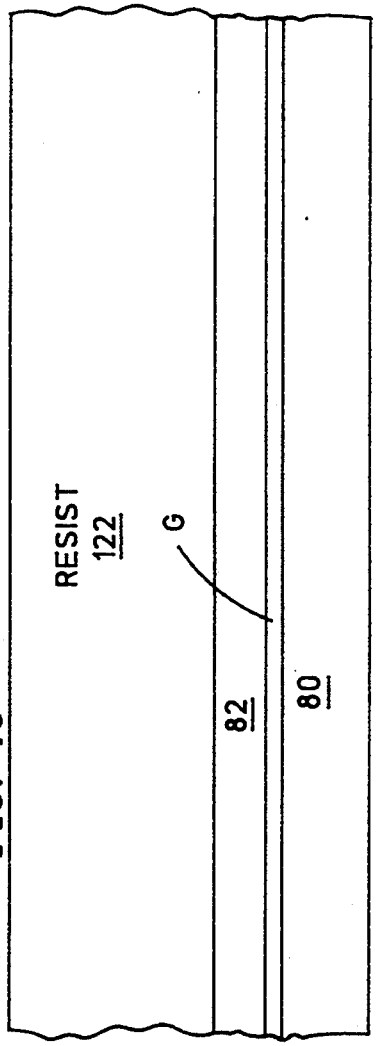

As shown in FIG. 11, a resist layer 122 is deposited on top of the bottom magnetic layer 82 of the top pole P2. The thickness of the resist layer is in the range of 5 to 10 microns. This is another one of the features of the present invention. In the prior art a resist layer of 20 microns or more was required after depositing the top magnetic layer 81 of the top pole P2 to protect this layer from ion bombardment. Because of light scattering during the photo masking step the side surfaces between the film surfaces of the 20 micron resist layer could not be well defined. This lack of definition prevented subsequent ion milling, to be discussed hereinafter, from producing narrow widths of the pole tips PT1b and PT2b. When the resist layer is 10 microns or less there is much less light scattering and the photomasking will provide well-defined sides in the photoresist mask.

Figure 12:
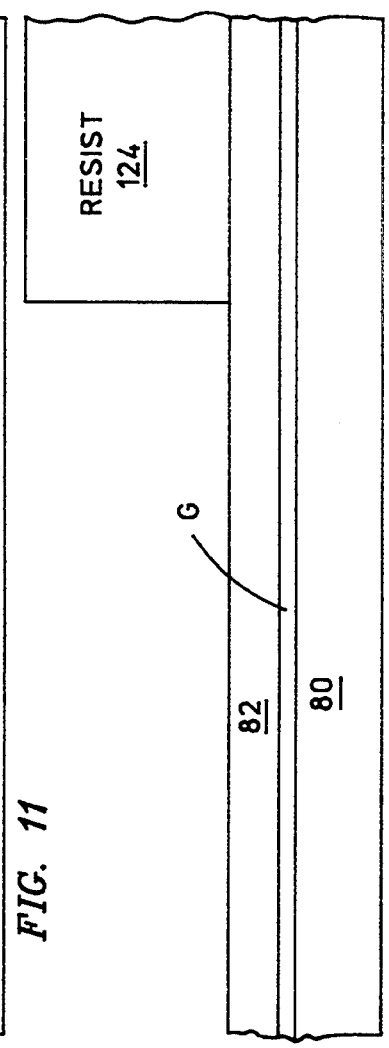

As shown in FIGS. 12 and 13, the resist layer 122 is developed into a photoresist mask which comprises two photoresist layers 124 and 126 which have well-defined sides between their top and bottom film surfaces. The front resist layer 124 covers the pole tip region where the pole tip of the write head is to be located. The width of the resist layer (FIG. 13) is the width that is desired for the track width of the write head. A 0.7 micron track width is feasible with the present invention. As shown in FIG. 12, the backside of the front resist layer 124 coincides with the zero throat level of the pole tip. The resist layer 126 covers the back gap BG.

Next, ion milling is performed on the following layers: (1) the bottom magnetic layer 82 of the top pole P2; (2) the gap layer G, and (3) the magnetic layer 80 of the bottom pole P1 as illustrated in FIG. 14. Because of the protection of the resist layers, this ion milling leaves front portions of the magnetic layer 82, the gap layer G and the magnetic layer 80 to form pole tip element PT2b, pole tip gap layer G and pole tip element PT1b respectively. The resist layers are removed after milling as shown in FIG. 15.

The ion milling leaves a back portion of the bottom magnetic layer 82 of the top pole P2 and a back portion of the magnetic layer 80 of the bottom pole P1 to form a part of the back gap BG. As shown in FIG. 15, the ion milling removed back portions of the bottom magnetic layer 82 of the top pole P2, the gap layer G and the magnetic layer 80 of the bottom pole P1 between the zero throat level and the back gap to form a well. As shown in FIG. 15, the ion milling also forms a back wall for each of the pole tip element PT2b, the gap layer G and the pole tip element PT1b. The back walls of the pole tip element PT2b, the gap layer G and the pole tip element PT1b lie contiguously in a common plane to form a pole tip back wall 122 at the zero throat level.

Figure 16:
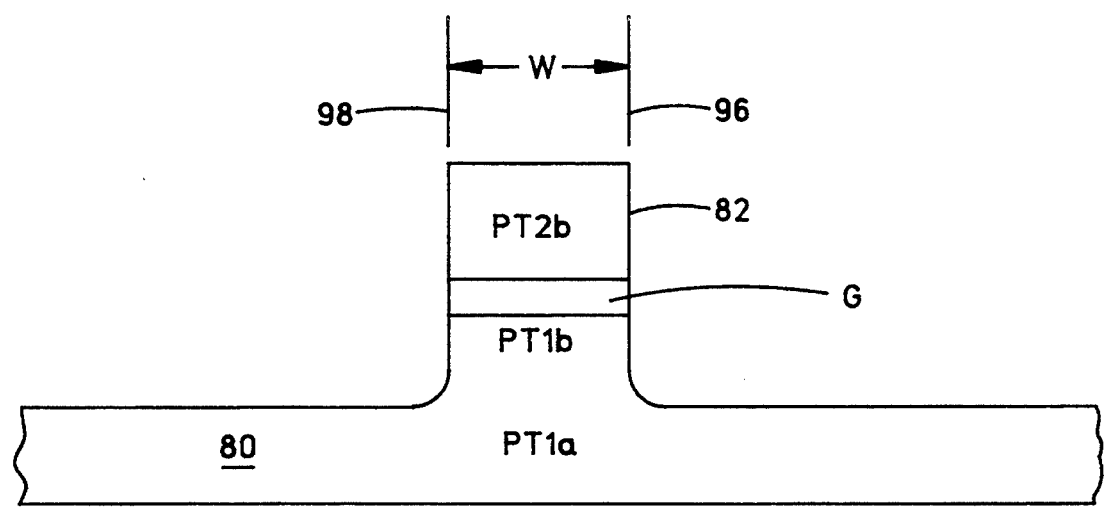
Figure 17:
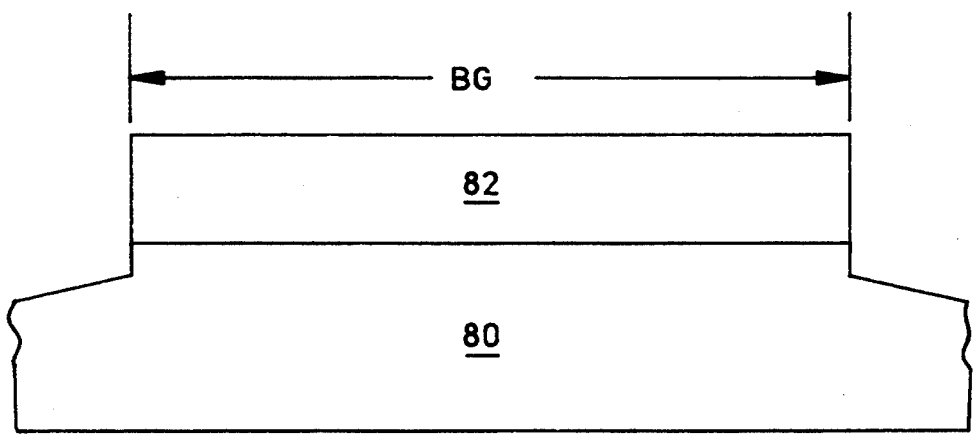

As shown in FIG. 16, the ion milling also forms first and second sidewalls for each of the pole tip elements PT1b and PT2b and the gap layer G, the first sidewalls of the elements and the gap layer lying in the first common plane 96 and the second sidewalls of the elements and gap layer lying in the second common plane 98. The first and second common planes 96 and 98 are spaced a distance w from one another in a parallel relationship to define the track width of the write head. With the present invention the track width can be submicron, such as 0.7 microns. This narrow track width is obtainable because of the thin resist front layer 124 and the ion milling. The back gap area BG is shown in FIG. 17, where the bottom magnetic layer 82 of the top pole P2 makes magnetic connection with the magnetic layer 80 of the bottom pole P1.

It should be understood that the preferred layer removal process for obtaining good definition of the pole tip elements PT1b and PT2b and the gap layer G is accomplished by ion beam milling. However, acceptable definition can be obtained by any dry etching process. Dry etching includes reactive ion beam etching as well as ion beam milling.

Figure 21:
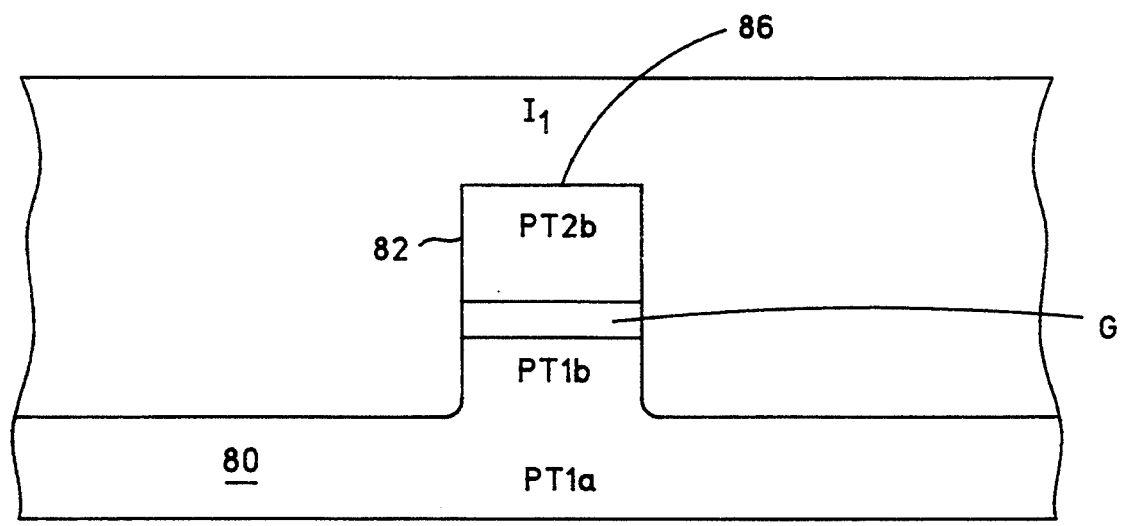
Figure 22:
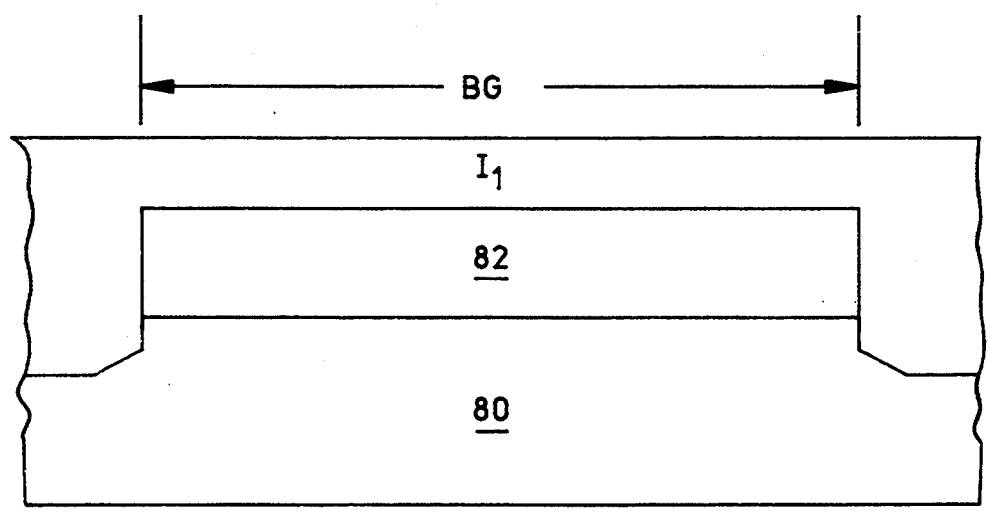

As shown in FIG. 18, a first insulation layer $I_1$ is formed in the well between the zero throat level and the back gap BG. The top of the insulation layer is higher than the top film surface 86 of the pole tip element PT2b. As shown in FIG. 19, the first insulation layer $I_1$ has a raised portion above the pole tip structure because of the elevation of the pole tip structure. The same is true in the back gap area (not shown). As shown in FIGS. 20 and 21 the raised portions are eliminated by lapping the first insulation layer $I_1$. This leaves the first insulation layer $I_1$ with a flat surface 106 which is higher than the top film surface 86 of the pole tip element PT2b. The elevation of the top flat surface 106 above the top of the magnetic layer 82 at the back gap is illustrated in FIG. 22. The first insulation layer $I_1$ can be aluminum oxide ($AL_2O_3$) which is easily lapped.

As shown in FIG. 23, the conductor layer 108 is formed on top of the first insulation layer $I_1$. Since the first insulation layer is nonconductive, a seed layer (not shown) is deposited first. Then a photoresist mask is applied and the conductor layer 108 is plated. The resist layer is then removed.

As shown in FIG. 24, a second insulation layer $I_2$ is deposited on top of the conductor layer 108 and the first insulation layer $I_1$. As shown in FIG. 25, the first and second insulation layers $I_1$ and $I_2$ have been removed from the top of the pole tip element PT2b and from the top of the bottom magnetic layer 82 of the top pole P2 at the back gap BG. This can be accomplished by photo masking and etching in the desired areas.

As shown in FIG. 26, the top magnetic layer 81 of the top pole P2 is formed on top of: (1) the pole tip element PT2b, (2) the second insulation layer $I_2$ and (3) the back gap BG. This deposition makes magnetic connection between the magnetic layers 81 and 80 of the poles P1 and P2 via the magnetic layer 82 at the back gap.

Figure 28:
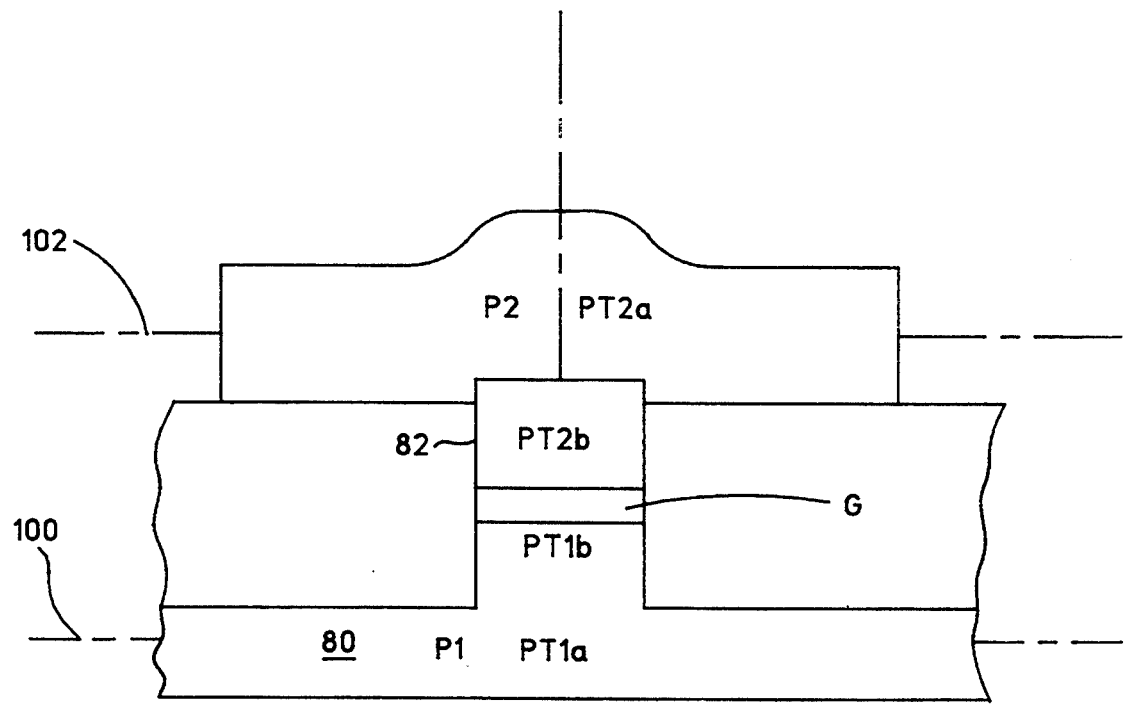
Figure 29:
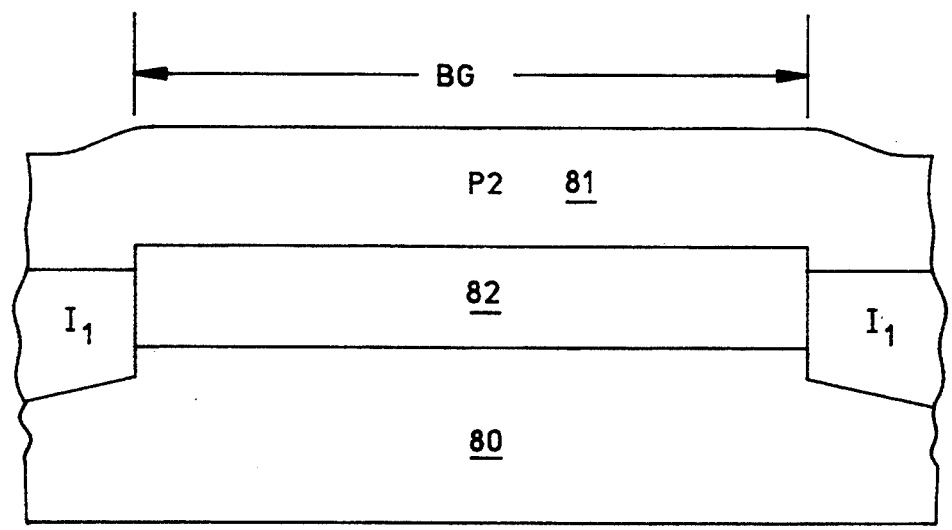

As shown in FIG. 26, the deposition of the magnetic layers and the ion milling leaves pole tip elements PT1a, PT1b, PT2a and PT2b with forward portions which extend forward of the ABS. As shown in FIG. 27, these forward portions are lapped to form the ABS, thus completing the main portion of the write head. The final configuration of the ABS view of the pole tip is shown in FIG. 28. A view of the back gap BG is illustrated in FIG. 29, which view is seen in a plane parallel to the ABS.

As shown in FIG. 28, the lapping forms each of the pole tip elements PT1b and PT2b with front rectangular walls, each front rectangular wall having a longitudinal axis 99 which extends perpendicular to the film surfaces 86 and 87 of the pole tip element PT2b. The thickness of the pole tip layer PT2b is constructed to provide its front wall with a length along its longitudinal axis 99 which is approximately 1½ times the thickness of the pole tip gap layer G. For instance, if the pole tip gap layer G is 0.3 microns thick, then this distance will be 0.45 microns.

Because of the thin photoresist layer in the pole tip region and the ion milling of that region, the plane of the zero throat level will be formed in a plane which is parallel to the plane of the ABS after the lapping procedure illustrated in FIG. 27.

As shown in FIG. 28, the fabrication steps leave the front wall of the pole tip element PT1a with a laterally extending elongated surface which has longitudinal axis 100, and leave the front wall of the pole tip element PT2a with a laterally extending front wall which has longitudinal axis 102. The longitudinal axes 100 and 102 are parallel with respect to one another and perpendicular to the axis 99. Further, the front wall of the pole tip element PT1a is substantially wider than the pole tip element PT1b, and the pole element PT2a is substantially wider than the pole tip element PT2b. As an example, the lateral width of each of the pole tip elements PT1b and PT2b may be in the range of 0.7 to 1 micron. The lateral width of the pole tip element PT1a may be in the order of 50 microns and the lateral width of the pole tip element PT2a may be in the order of 7 microns. All of the pole tips can be approximately the same thickness.

Figure 30:
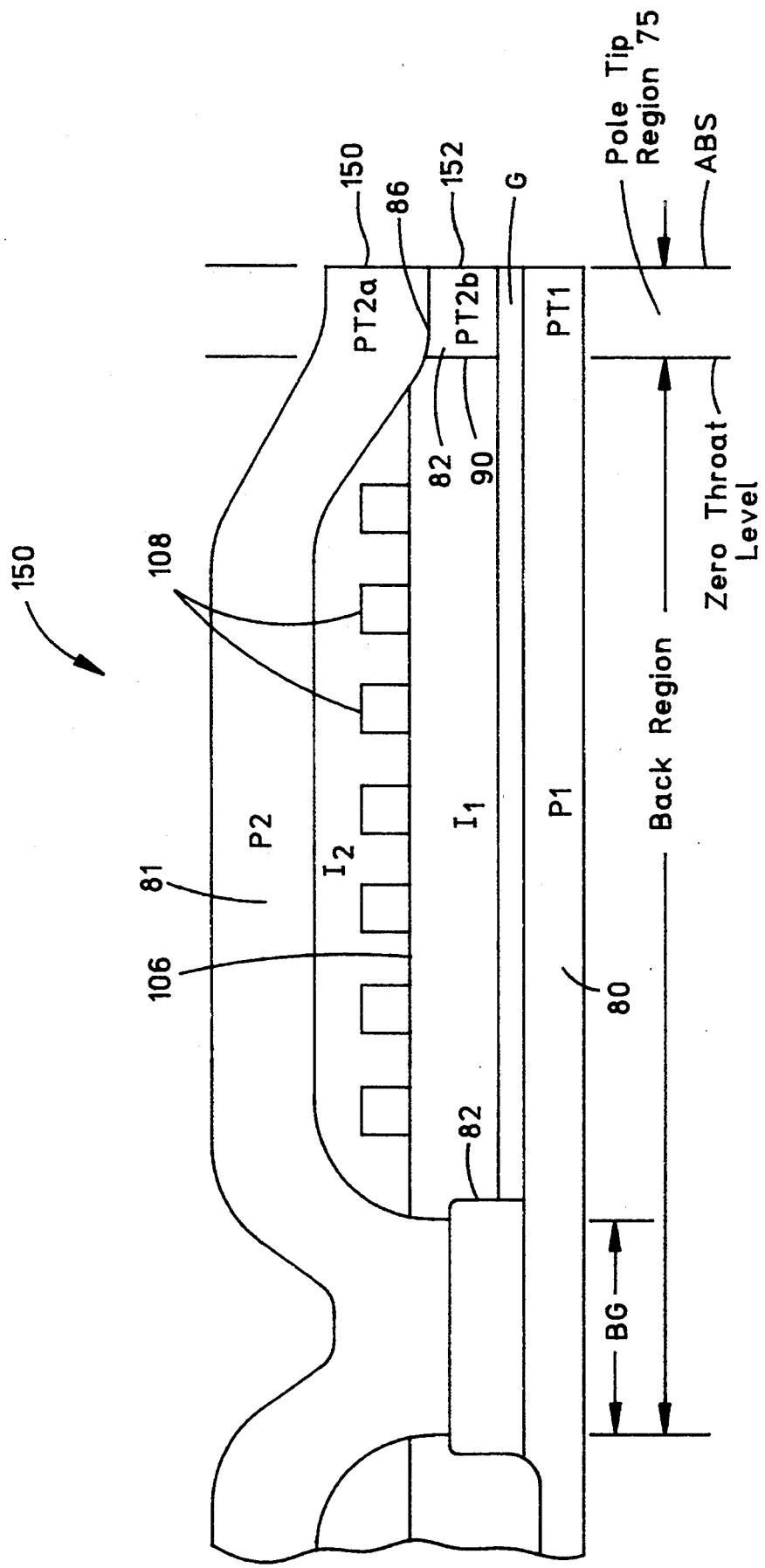
FIG. 30 is a side cross-sectional view through a modified merged MR head.
Figure 31:
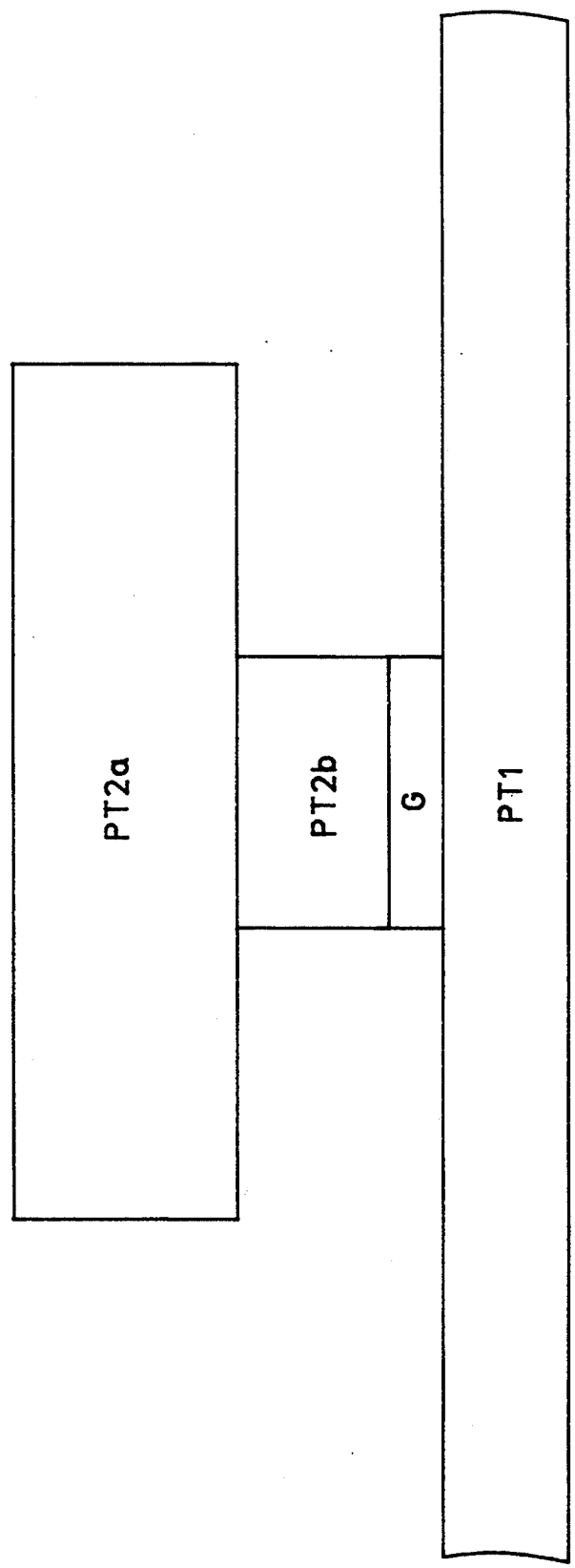
FIG. 31 is an ABS view of the modified head of FIG. 30.

Another embodiment of the merged MR head is illustrated at 150 in FIGS. 30 and 31. The head 150 in FIG. 30 is similar to the head 52 in FIG. 5 except for several modifications. The pole tip structure PT1 of the bottom pole P1 in FIG. 30 does not have a back wall at the zero throat level whereas the pole tip structure PT1a and PT1b of the bottom pole P1 in FIG. 5 has a back wall portion at the zero throat level. The only pole tip structure that has a back wall at the zero throat level in the head 150 in FIG. 130 is the pole tip element PT2b. The pole tip PT2b has a back wall 90 which is planar and which is substantially parallel to the plane of the ABS. Similar to the FIG. 5 embodiment, the pole tip elements PT2a and PT2b of the top pole P2 have front walls 152 and 154, respectively, which lie contiguously in the plane of the ABS. The planar structure of the back wall 90 of the pole tip PT2b still provides some of the benefits afforded by the embodiment 52 shown in FIG. 5. The back wall 90 can be accurately placed to define the zero throat level. Further, the transition of the top pole P2, where it is stitched to the pole tip element PT2b at 86, is smooth which minimizes flux leakage or saturation problems. Another difference of the embodiment 150 shown in FIG. 130 is that the gap layer G extends from the ABS to the back gap 82. If desired, the coil structure 108 could be formed directly on top of the gap layer or on top of a thinner first insulation layer $I_1$ so that the coil structure 108 is at least partially below the top film surface 86 of the pole tip element PT2b.

The making of the modified merged MR head 150 of FIG. 130 is similar to the making of the head 52 which is illustrated in FIG. 5. The difference is that the bottom pole P1 does not have an extra layer formed on it in the pole tip region nor is the bottom pole P1 notched by ion beam milling in the pole tip region. Another difference is that the gap layer G is not defined by any process steps in the pole tip region. The gap layer G, however, will be removed in the back gap region BG. The pole tip element PT2b and its counterpart 82 at the back gap can be laid as a single layer and then configured by ion beam milling to form the well therebetween. Alternatively, the element PT2b and the back gap portion 82 can be formed by frame plating to form the well therebetween.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A thin film magnetic write head which has a pole tip region which extends from a substantially planar air bearing surface (ABS) to a zero throat level and a back region which extends from the zero throat level to and including a back gap comprising:

a bottom pole P1 and a top pole P2, each of the top and bottom poles having a pole tip structure in the pole tip region and a back layer portion in the back region;

the pole tip structure of the bottom pole P1 including bottom and top pole tip elements PT1a and PT1b respectively and the pole tip structure of the top pole P2 including top and bottom pole tip elements PT2a and PT2b respectively;

a gap layer G sandwiched between the pole tip elements PT1b and PT2b; and the pole tip elements PT1b and PT2b and the gap layer G each having a substantially planar back wall at the zero throat level, the back walls of the pole tip element PT1b, the gap layer G and the pole tip element PT2b collectively forming a planar pole tip back wall at the zero throat level which is substantially parallel to the ABS.

2. A disk drive including the write head of claim 1, the drive further including:

a housing;

means mounted in the housing for rotating a magnetic disk; and a support, including a slider, mounted in the housing for supporting the write head in a transducing relationship with respect to a magnetic disk when the magnetic disk is rotated by the means for rotating.

3. A write head as claimed in claim 1 including:

the pole tip elements PT1a and PT1b being integral.

4. A write head as claimed in claim 1 including:

the pole tip elements PT1a and PT1b being separate layers.

5. A merged MR head including the write head of claim 1, the merged MR head including:

first and second shield layers;

first and second gap layers located between the first and second shield layers;

a magnetoresistive sensor layer located between the first and second gap layers; and the bottom pole P1 comprising the second shield layer.

6. A write head as claimed in claim 1 including:

the pole tip element PT1*b*, the gap layer G and the pole tip element PT2*b* each having first and second substantially planar sidewalls which are contiguous with the respective back wall, the first sidewalls of the pole tip element PT1*b*, the gap layer G and the pole tip element PT2*b* collectively forming a first planar pole tip sidewall and the second sidewalls of the pole tip element PT1*b*, the gap layer G and the pole tip element PT2*b* collectively forming a second planar pole tip sidewall, the first and second pole tip sidewalls being spaced from one another by a distance w at the ABS to establish the track width of the magnetic head.

7. A write head as claimed in claim 6 including:

the pole tip element PT1*b*, the gap layer G and the pole tip element PT2*b* each having a top and a bottom substantially planar film surface, the film surfaces of the pole tip element PT1*b*, the gap layer G and the pole tip element PT2*b* being substantially parallel with respect to one another; and each of the first and second pole tip sidewalls being substantially perpendicular to said film surfaces; and the first and second pole tip sidewalls being parallel with respect to one another.

8. A write head as claimed in claim 7 including:

the pole tip element PT1*b* having a front wall and a top film surface, the top film surface of the pole tip element PT1*b* being bounded by its front and back walls and its first and second sidewalls;

the gap layer G and the pole tip element PT2*b* each having a front wall and top and bottom film surfaces, the top and bottom film surfaces of each of the gap layer G and the pole tip element PT2*b* being bounded by its front wall, back wall and first and second sidewalls;

the front walls of the pole tip element PT1*b*, the gap layer G and the pole tip element PT2*b* forming a part of the ABS; and each of the front walls of the pole tip element PT1*b* and the pole tip element PT2*b* having an elongated rectangular shape, the front walls of the pole tip element PT1*b* and the pole tip element PT2*b* having a common longitudinal axis which is substantially perpendicular to said top and bottom film surfaces.

9. A write head as claimed in claim 8 including:

the pole tip elements PT1*a* and PT2*a* each having a front wall at the ABS, the front wall of the pole tip element PT1*a* being substantially wider than the front wall of the pole tip element PT1*b* and the front wall of the pole tip element PT1*a* being substantially wider than the front wall of the pole tip layer PT2*b*.

10. A write head as claimed in claim 7 including:

the distance w being in the range of 0.7 microns to 1 micron.

11. A write head as claimed in claim 10 including:

the thickness of the gap layer being substantially 0.2 to 0.3 microns.

12. A write head as claimed in claim 11 including:

the pole tip element PT1*b* having a front wall and a top film surface, the top film surface of the pole tip element PT1*b* being bounded by its front and back walls and its first and second sidewalls;

the gap layer G and the pole tip element PT2*b* each having a front wall and top and bottom film surfaces, the top and bottom film surfaces of each of the gap layer G and the pole tip element PT2*b* being bounded by its front wall, back wall and first and second sidewalls;

the front walls of the pole tip element PT1*b*, the gap layer G and the pole tip element PT2*b* forming a part of the ABS; and each of the front walls of the pole tip element PT1*b* and the pole tip element PT2*b* having an elongated rectangular shape, the front walls of the pole tip element PT1*b* and the pole tip element PT2*b* having a common longitudinal axis which is substantially perpendicular to said top and bottom film surfaces.

13. A write head as claimed in claim 12 including:

the pole tip elements PT1*a* and PT2*a* each having a front wall at the ABS, the front wall of the pole tip element PT1*a* being substantially larger than the front wall of the pole tip element PT1*b* and the front wall of the pole tip element PT1*a* being substantially larger than the front wall of the pole tip layer PT2*b*.

14. A write head as claimed in claim 1 including:

the pole tip element PT2*b* having a top film surface;

a first insulation layer $I_1$ on top of the back layer portion of the bottom magnetic pole P1 and having a top flat surface which is higher than the top film surface of the pole tip element PT2*b*; and a coil layer mounted on top of the first insulation layer $I_1$.

15. A write head as claimed in claim 14 including:

a second insulation layer $I_2$ mounted on top of the coil layer; and the back layer portion of the top pole P2 being located on top of the second insulation layer $I_2$ and being magnetically connected to the back layer portion of the bottom pole P1 at the back gap.

16. A disk drive including the write head of claim 15, the drive further including:

a housing;

means mounted in the housing for rotating a magnetic disk; and a support, including a slider, mounted in the housing for supporting the write head in a transducing relationship with respect to a magnetic disk when the magnetic disk is rotated by the means for rotating.

17. A write head as claimed in claim 15 including:

the pole tip element PT1*b*, the gap layer G and the pole tip element PT2*b* each having first and second substantially planar sidewalls which are contiguous with the respective back wall, the first sidewalls of the pole tip element PT1*b*, the gap layer G and the pole tip element PT2 collectively forming a first planar pole tip sidewall and the second sidewalls of the pole tip element PT1*b*, the gap layer G and the pole tip element PT2*b* collectively forming a second planar pole tip sidewall, the first and second pole tip sidewalls being spaced from one another by a distance w at the ABS to establish the track width of the magnetic head.

18. A write head as claimed in claim 17 including:

the pole tip element PT1*b*, the gap layer G and the pole tip element PT2*b* each having a top and a bottom substantially planar film surface, the film surfaces of the pole tip element PT1*b*, the gap layer G and the pole tip element PT2*b* being substantially parallel with respect to one another; and each of the first and second pole tip sidewalls being substantially perpendicular to said film surfaces; and the first and second pole tip sidewalls being parallel with respect to one another.

19. A write head as claimed in claim 18 including:

the pole tip element PT1*b* having a front wall and a top film surface, the top film surface of the pole tip element PT1*b* being bounded by its front and back walls and its first and second sidewalls;

the gap layer G and the pole tip element PT2*b* each having a front wall and top and bottom film surfaces, the top and bottom film surfaces of each of the gap layer G and the pole tip element PT2*b* being bounded by its front wall, back wall and first and second sidewalls;

the front walls of the pole tip element PT1*b*, the gap layer G and the pole tip element PT2*b* forming a part of the ABS; and each of the front walls of the pole tip element PT1*b* and the pole tip element PT2*b* having an elongated rectangular shape, the front walls of the pole tip element PT1*b* and the pole tip element PT2*b* having a common longitudinal axis which is substantially perpendicular to said top and bottom film surfaces.

20. A write head as claimed in claim 19 including:

the pole tip elements PT1*a* and PT2*a* each having a front wall at the ABS, the front wall of the pole tip element PT1*a* being substantially wider than the front wall of the pole tip element PT1*b* and the front wall of the pole tip element PT1*a* being substantially wider than the front wall of the pole tip layer PT2*b*.

21. A write head as claimed in claim 20 including:

the distance w being in the range of 0.7 microns to 1 micron.

22. A write head as claimed in claim 21 including:

the thickness of the gap layer being substantially 0.3 microns.

23. A merged MR head including the write head of claim 22, the merged head including:

first and second shield layers;

first and second gap layers located between the first and second shield layers;

a magnetoresistive sensor layer located between the first and second gap layers; and the bottom pole P1 comprising the second shield layer.

24. A disk drive including the write head of claim 23, the drive further including:

a housing;

means mounted in the housing for rotating a magnetic disk; and a support, including a slider, mounted in the housing for supporting the write head in a transducing relationship with respect to a magnetic disk when the magnetic disk is rotated by the means for rotating.

25. A write head as claimed in claim 24 including:

the pole tip elements PT1*a* and PT1*b* being integral.

26. A write head as claimed in claim 24 including:

the pole tip elements PT1*a* and PT1*b* being separate layers.

27. A thin film magnetic write head which has a pole tip region which extends from a substantially planar air bearing surface (ABS) to a zero throat level and a back region which extends from the zero throat level to and including a back gap comprising:

a bottom pole P1 and a top pole P2, each of the top and bottom poles having a pole tip structure in the pole tip region and a back layer portion in the back region;

each of the pole tip elements PT2*a* and PT2*b* having a front wall, the front wall of the pole tip elements PT2*a* and PT2*b* lying contiguously in a common plane which defines the ABS;

the pole tip structure of the top pole P2 including top and bottom pole tip elements PT2*a* and PT2*b* respectively;

a gap layer G sandwiched between the pole tip structure of the bottom pole P1 and the pole tip element PT2*b* of the top pole P2; and the pole tip element PT2*b* having a substantially planar back wall at the zero throat level which is substantially parallel to the ABS.

28. A write head as claimed in claim 27 including:

the pole tip element PT2*b* having a top film surface;

a first insulation layer $I_1$ on top of the back layer portion of the bottom pole P1 and having a top flat surface which is higher than the top film surface of the pole tip element PT2*b*; and a coil layer mounted on top of the first insulation layer $I_1$.

29. A write head as claimed in claim 28 including:

a second insulation layer $I_2$ mounted on top of the coil layer; and the back layer portion of the top pole P2 being located on top of the second insulation layer $I_2$ and being magnetically connected to the back layer portion of the bottom pole P1 at the back gap.

30. A merged MR head including the write head of claim 29, the merged MR head including:

first and second shield layers;

first and second gap layers located between the first and second shield layers;

a magnetoresistive sensor layer located between the first and second gap layers; and the bottom pole P1 comprising the second shield layer.

31. A disk drive including the merged MR head of claim 30, the drive further including:

a housing;

means mounted in the housing for rotating a magnetic disk; and a support, including a slider, mounted in the housing for supporting the write head in a transducing relationship with respect to a magnetic disk when the magnetic disk is rotated by the means for rotating.

32. A thin film magnetic write head which has a pole tip region which extends from a substantially planar air bearing surface (ABS) to a zero throat level and a back region which extends from the zero throat level to and including a back gap comprising:

a bottom pole P1 and a top pole P2, each of the top and bottom poles having a pole tip structure in the pole tip region and a back layer portion in the back region;

the pole tip structure of the top pole P2 including top and bottom pole tip elements PT2*a* and PT2*b* respectively;

the pole tip element PT2*b* having a top film surface;

a first insulation layer I$_1$ on top of the back layer portion of the bottom pole P1 and having a top flat surface which is higher than the top film surface of the pole tip element PT2*b*; and a coil layer mounted on top of the first insulation layer I$_1$.

33. A write head as claimed in claim 32 including:

a second insulation layer 12 mounted on top of the coil layer; and the back layer portion of the top pole P2 being located on top of the second insulation layer I$_2$ and being magnetically connected to the back layer portion of the bottom pole P1 at the back gap.

* * * * *